United States Patent [19]
Kieffer

[11] Patent Number: 5,103,649
[45] Date of Patent: Apr. 14, 1992

[54] FROZEN CARBONATED BEVERAGE APPARATUS AND METHOD AND CONTROL SYSTEM THEREFOR

[75] Inventor: Joseph W. Kieffer, Maple Grove, Minn.

[73] Assignee: IMI Cornelius Inc., Anoka, Minn.

[21] Appl. No.: 694,460

[22] Filed: May 1, 1991

Related U.S. Application Data

[63] Continuation-in-part of Ser. No. 495,876, Mar. 19, 1990.

[51] Int. Cl.$^5$ .............................................. A23G 9/00
[52] U.S. Cl. ...................................... 62/136; 62/234; 62/251; 366/145
[58] Field of Search ................ 62/136, 155, 234, 351; 366/145

[56] References Cited

U.S. PATENT DOCUMENTS 3,519,910 7/1970 Pfaff et al. ............................ 318/218
3,667,244 6/1972 Hock ...................................... 62/136
4,383,417 5/1983 Martineau ............................. 62/136

*Primary Examiner*—William E. Wayner
*Attorney, Agent, or Firm*—Sten Erik Hakanson

[57] ABSTRACT

The present invention concerns improvements in the electronic control of frozen carbonated beverage machines and improvements in electric defrost heaters used therein. A control scheme is shown that provides for accurately determining the viscosity of a semi-frozen beverage as a function of the torque of a drive motor used in the harvesting and mixing thereof. The torque is first calculated based upon the current and voltage to the motor and the phase difference there between. The torque is adjusted to compensate for motor efficiency after which the net torque value is converted to a viscosity scale. The viscosity scale has a zero value relating to the net torque experienced by the motor when the beverage is known to be completely liquid. Viscosity is maintained within a narrow range based upon pre-defined three level low, medium and high viscosity sets, and wherein compressor short-cycling is eliminated. Recalibration control is shown for reestablishing a new viscosity zero value to allow for changes in the net torque at the beverage known liquid point that can result from machine wear, inaccurate initial calibration and the like. A safety defrost control is shown for reducing potential hazards associated with the use of electric defrost heaters. improved electrical defrost heaters are shown that allow for easy removal and replacement thereof.

29 Claims, 22 Drawing Sheets

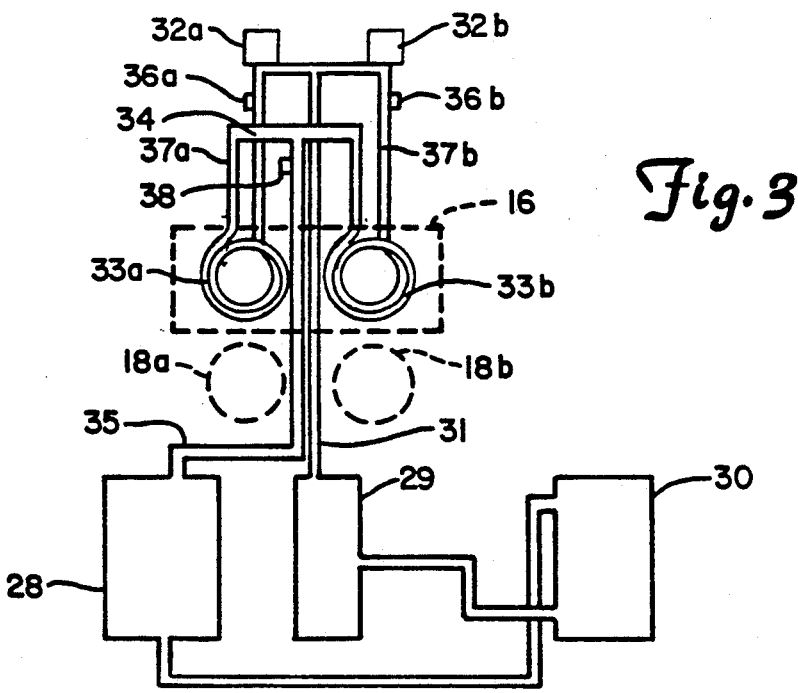
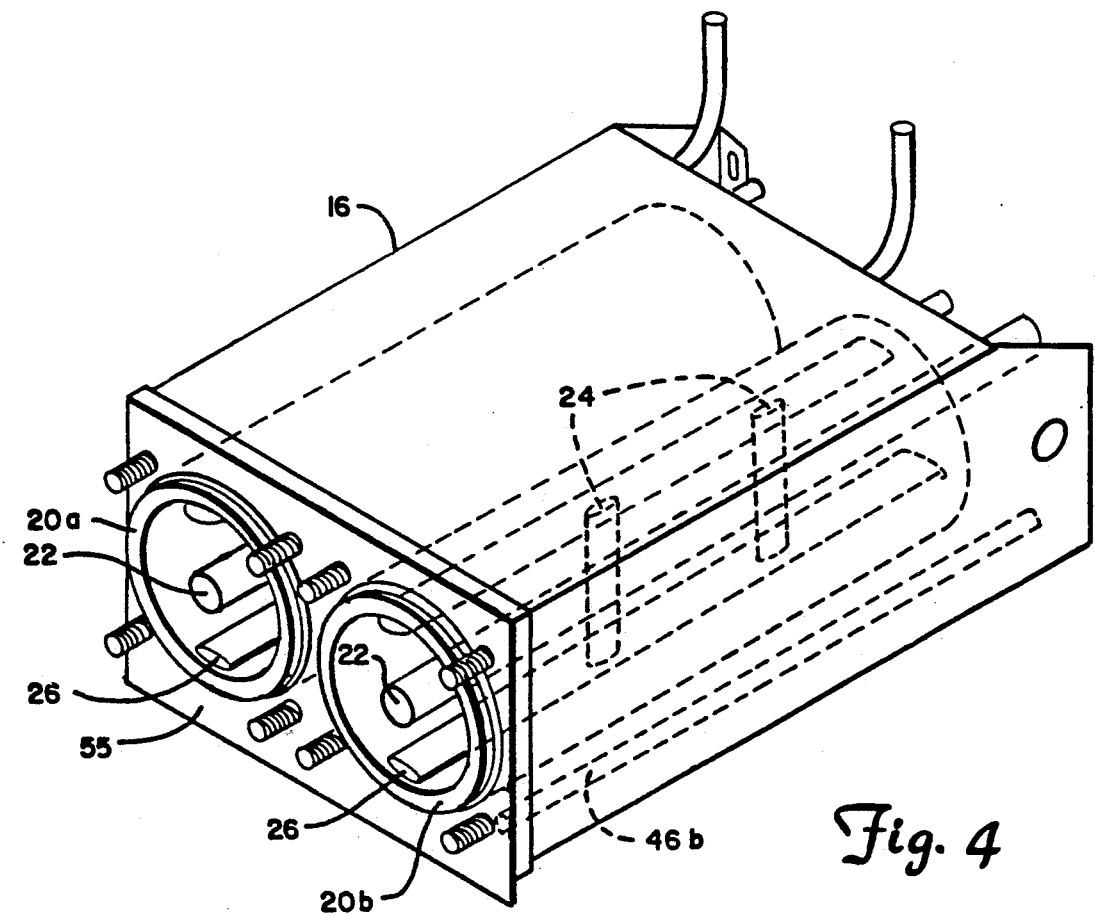

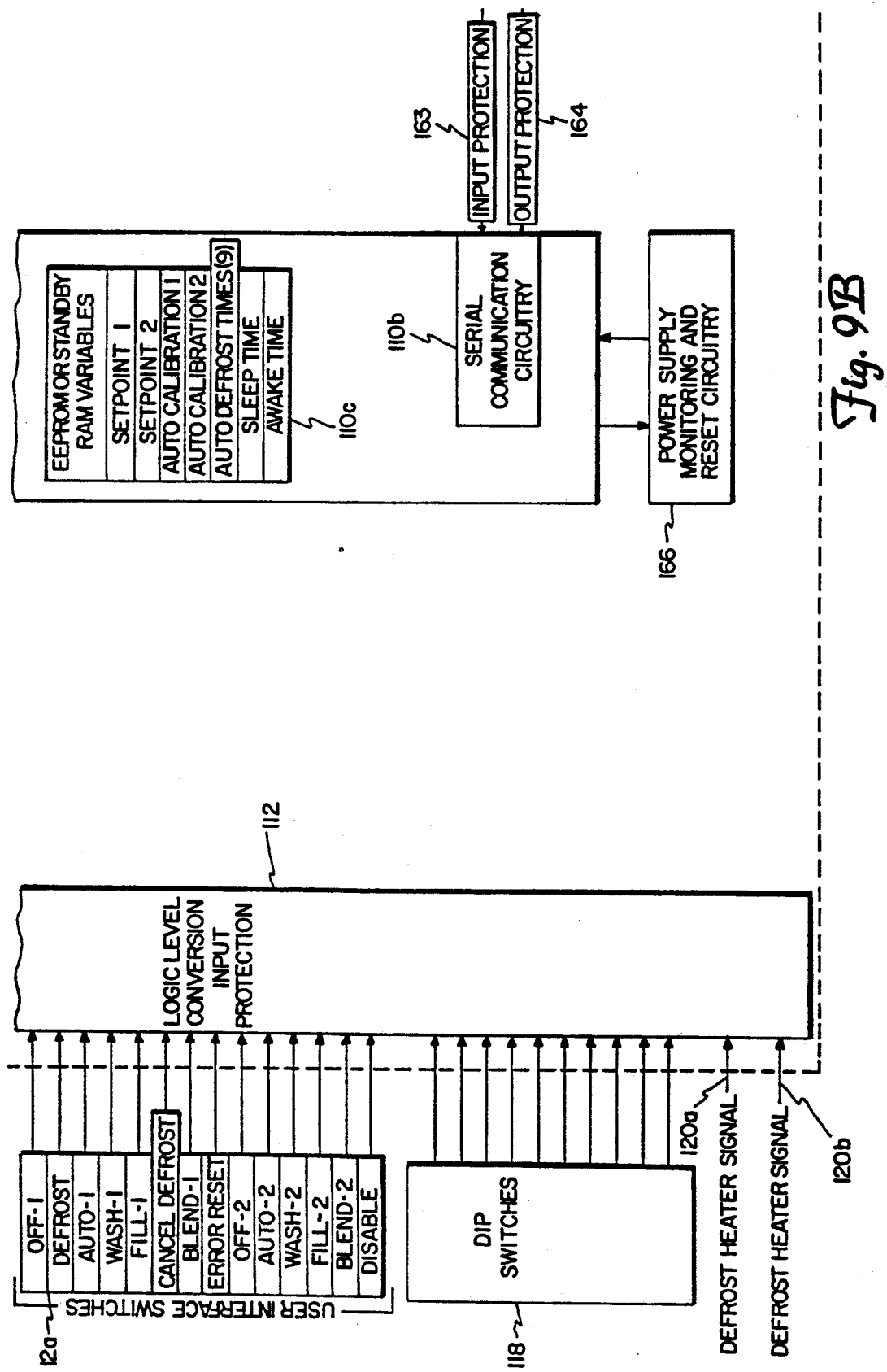

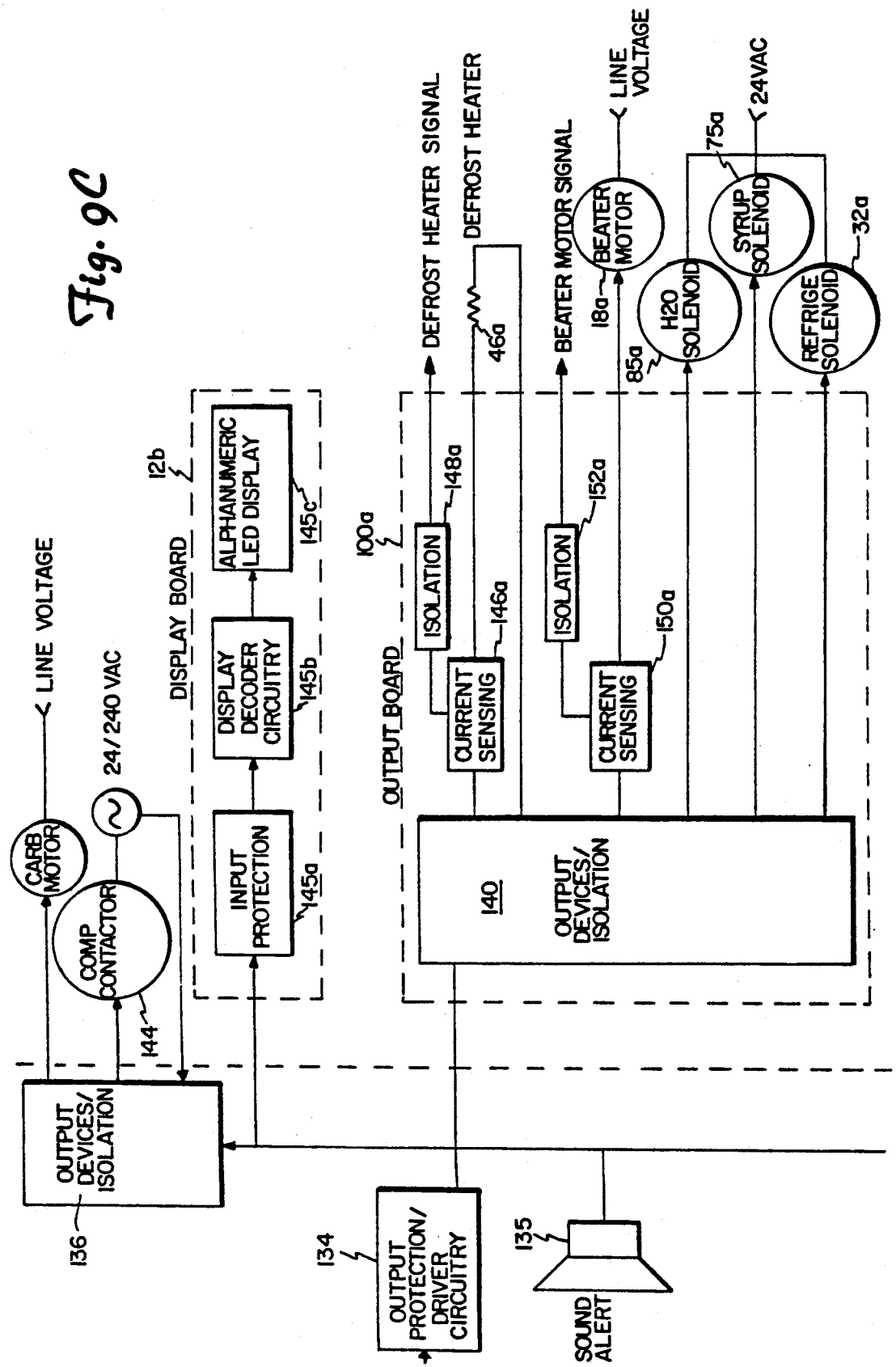

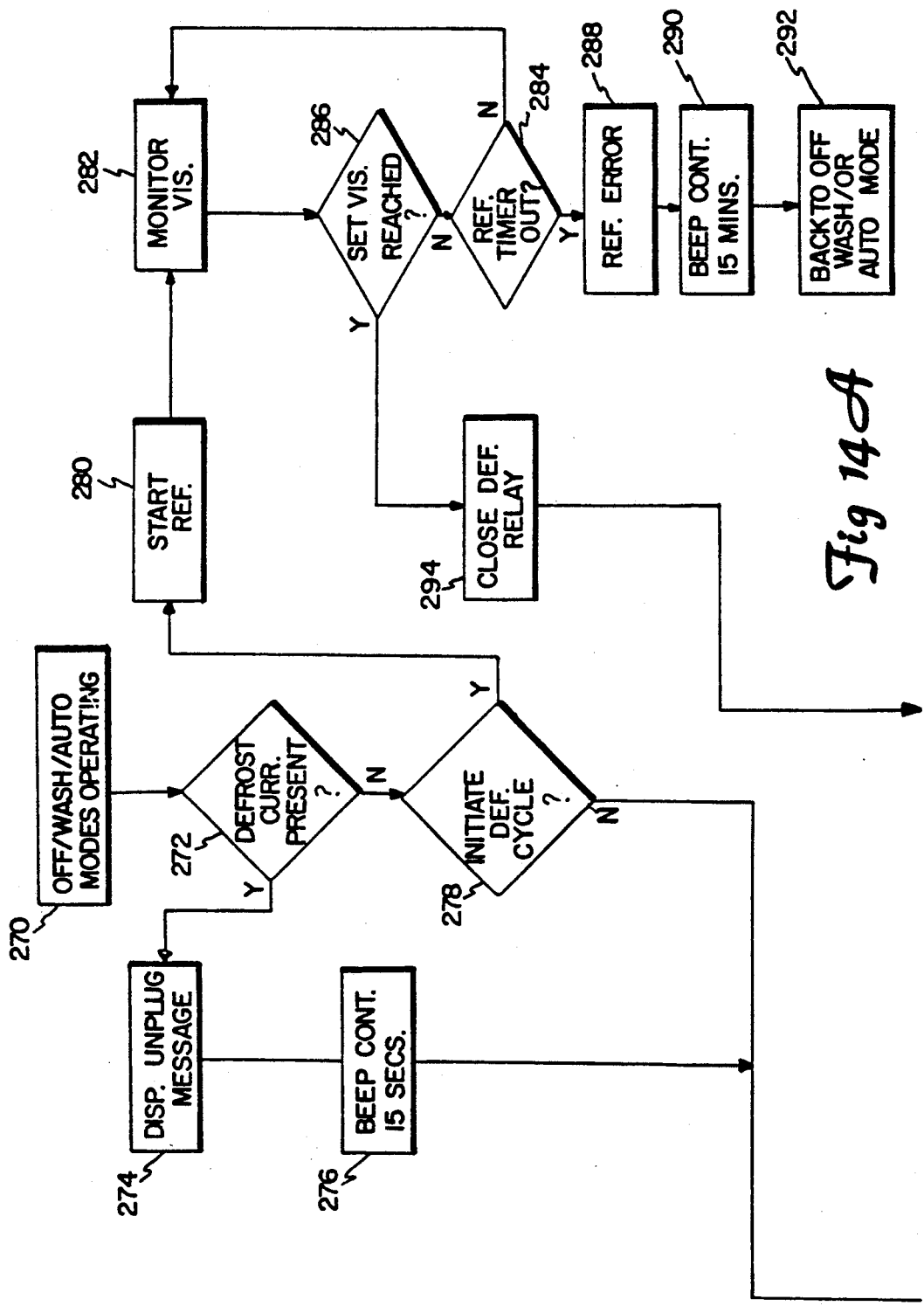

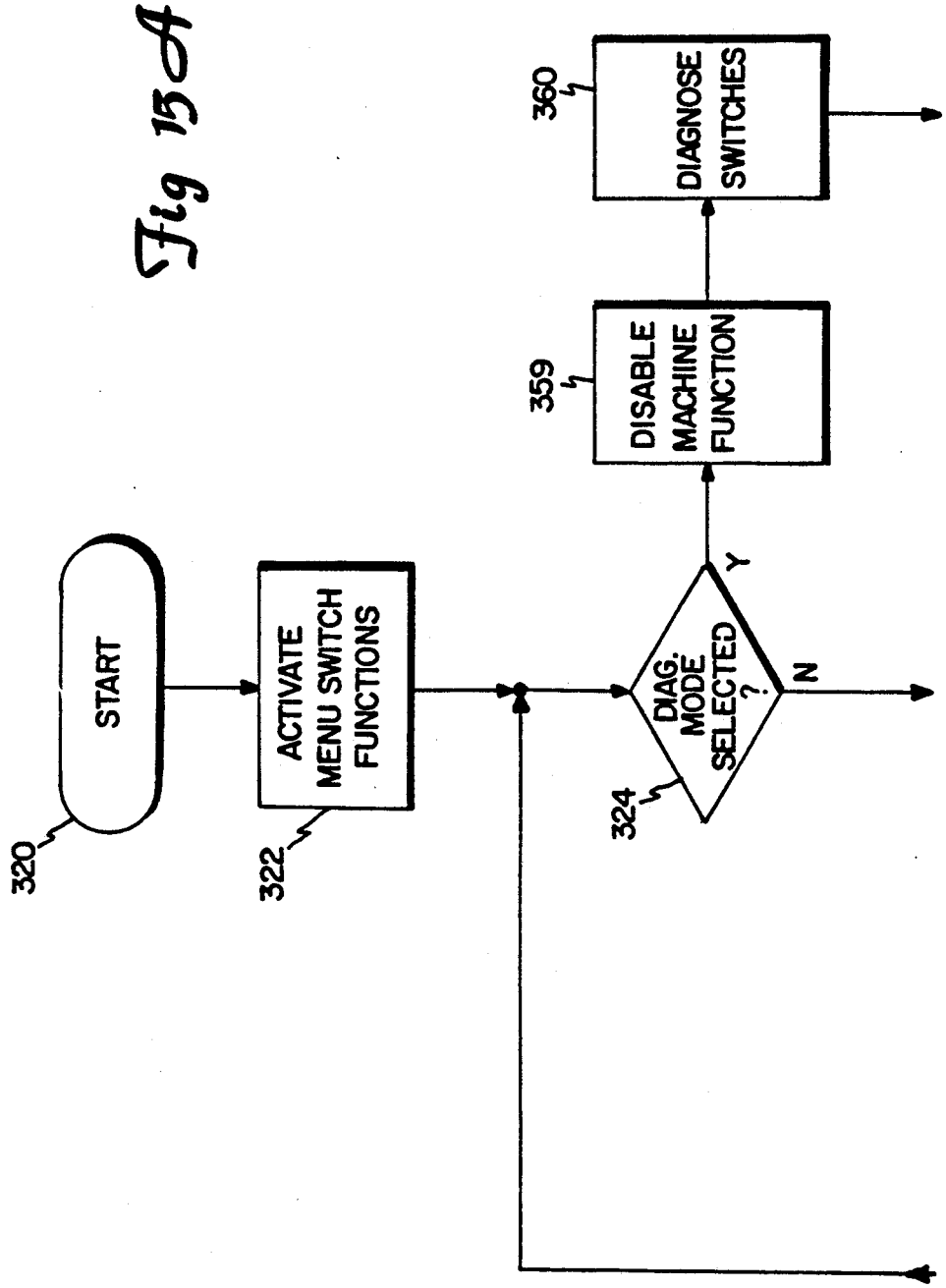

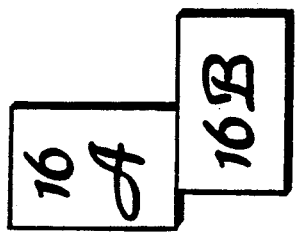
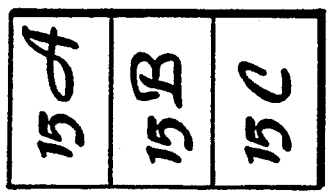
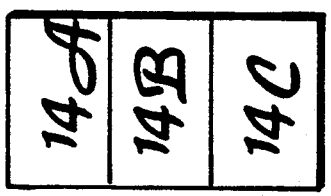
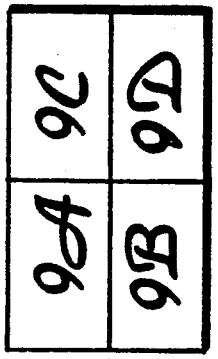
Fig. 17

FROZEN CARBONATED BEVERAGE APPARATUS AND METHOD AND CONTROL SYSTEM THEREFOR

BACKGROUND

The present application is a continuation-in-part of U.S. Ser. No. 07/495,876, filed Mar. 19, 1990.

FIELD OF THE INVENTION

The present invention relates generally to frozen carbonated beverage dispensing equipment, and more particularly to control and defrosting apparatus therefor.

BACKGROUND OF THE INVENTION

Frozen carbonated beverage machines are well known in the art, as seen, for example, in U.S. Pat. Nos. 3,608,779 and 3,460,713 to Richard T. Cornelius. Such equipment is designed to produce a slush beverage from the partial freezing of a combination of carbonated water and syrup. This confection is made by the continual harvesting thereof from the interior perimeter of a refrigerated cylinder.

Originally, frozen carbonated beverage machines were operated electro-mechanically. However, it was found that changes in ambient conditions, rate of beverage dispensing and the like, would have a great effect on the viscosity of the beverage, causing a drink to become either unacceptably loose or firm, as electro-mechanical systems would react too slowly or would overcompensate. Electronic controls are now used to provide for an improved ability to maintain the beverage viscosity within a predetermined desired range. As is known in the art, electronically pulsed expansion valves can provide for precise refrigeration control. Also, sensing the torque or power consumption of the motors that drive the harvesting mechanism provides an indication of the viscosity of the beverage. Thus, viscosity control is exerted through the use of electronically pulsed expansion valves operated in accordance with the sensed harvesting motor torque. However, scraper motors power requirement during a freezing cycle includes the resistance that results as the harvesting mechanism removes the portion of the newly semi-frozen beverage from the cylinder walls, as well as other factors normally present. Such factors include the frictional resistance that results from the mere contact between the harvesting mechanism and the cylinder interior, the drag caused by the beverage itself and that resulting from the motors and associated drive train components. Prior art machines have not been able to differentiate well between these variables. Thus, for example, during a freezing cycle harvesting load can be falsely interpreted to indicate that the beverage held in the cylinder has reached a desired firmness, whereupon refrigeration is stopped by turning off the compressor. However, if the beverage were not sufficiently firm, the sensed load would decrease rapidly as the stopping of refrigeration ends the production of further frozen beverage, hence the harvesting load associated therewith. Thus, refrigeration can be prematurely terminated, only to be quickly restarted, as the F.C.B. i.e. the frozen carbonated beverage machine control was not able to differentiate between the contribution of the two load factors. This ineffective control ability results in deleterious short-cycling of the compressor.

A further problem with respect to viscosity control relates to the ease of operation of the F.C.B. machine. Prior art machines inevitably require fine tuning and precise adjustment of the electronic hardware thereof by trained service personnel. Such adjustments can be frequent and of subtantial cost and inconvenience to the owner/operator who lacks the skill and knowledge necessary to attempt any direct manipulations of the machines electronics. Adjustment can be required due to changes in scraper motor load that can occur over times as the machine is used and various moving components, such as the harvesting mechanism, motor components and drive train, wear. Thus, if the load sensed on the motors does not compensate for such changes, the resulting beverage viscosity will also change over time for any given viscosity setting.

Repair of an F.C.B. machine can also be costly due to the amount of technician time that can be required to diagnose the particular problem. Thus, it would be very desirable to have an F.C.B. machine wherein the various sub-components could be quickly and easily evaluated.

It is also known in the art that the refrigeration components of an F.C.B. machine can be placed in a remote location and connected to the dispensing portion by appropriate refrigeration and water lines. In this manner the over-the-counter portion utilizes less space in the retail area. However, a problem with such units having remote refrigeration concerns the heating and defrosting of the cylinders that is periodically required for the removal of particulate ice formation in the beverage, and for maintenance or cleaning of the cylinders. Hot gas can be cycled from the refrigeration system through the evaporator coils to provide for the defrosting. However, if the lines connecting the remote refrigeration unit to the cylinders are exposed to excessively cold ambient conditions, the hot gas may not be of sufficient temperature to provide for adequate defrosting when it reaches the evaporator coils. Thus, electrical heating of the cylinders has been used. These prior art heaters are generally tubular and lie adjacent and parallel to the cylinders and in direct contact with the evaporator coils. The cylinders and heaters are held within a cylinder box substructure, the void areas of which are filled with a foam insulation. If a heater should fail, repair of the cylinder box can be very costly as such repair necessitates the time consuming steps of removal of the cylinder box from the machine, removal of the insulation, replacement of the heater and, finally, re-insulating and replacement of the box in the machine. Therefore, it would be desirable to provide for easily replaceable electric heaters in an F.C.B. machine. It would also be desirable to have an F.C.B. machine that provides for improved monitoring and control of electrical defrost heaters to minimize any hazards associated with the operation thereof.

SUMMARY OF THE INVENTION

The present invention concerns an electronic control having particular programming for use in a frozen carbonated beverage machine. The control includes a micro-processor connected to various sensing devices and machine operating systems for exercising control over the consistency of the dispensed beverage in response to the sensed information supplied to the processor. Specifically, harvesting motor power consumption is sensed and converted to a displayable viscosity value of a scale running from −9 to 99. The zero value of the scale is established at the end of each defrost cycle and represents the cumulative motor load at a point at which the beverage viscosity is known to zero. The pre-defined viscosity scale is established having several discrete settings wherein each setting has associated therewith a low, medium and high viscosity number. Each number corresponds proportionately to a sensed power consumption of a harvesting motor. Viscosity is controlled by a programmed series of steps wherein, after selection of a desired viscosity value, as represented by a low number, refrigeration is commenced and semi-frozen beverage is harvested from the cylinder walls. Motor torque is sensed periodically, and when that torque, after numerical conversion to the corresponding viscosity value, exceeds the viscosity high value, the expansion valves are closed stopping refrigeration. At this point however, the compressor continues to operate. A predetermined period of time is allowed to run subsequent to the closure of the expansion valves during which motor power, hence viscosity, is sensed. If the viscosity of the beverage goes below the middle level during the predetermined time period, the valve is opened and refrigeration of the cylinder is restarted. Refrigeration continues until the viscosity again exceeds the high value whereupon the time period is started again. If the viscosity does not go below the middle value during the time period, the compressor is also shut off. It can be appreciated that the closing of the valves stops refrigeration during the predetermined time period so that semi-frozen beverage production is halted, whereby the load on the motor will be solely to the viscosity of the beverage as the other load variables were factored out when the zero value was established.

As stated above, the zero value is determined at the end of each defrost cycle when the beverage is completely liquid. At that time, the harvesting motor torque is sensed, converted to the viscosity scale and that zero value stored in non-volatile memory means. Thus, the present invention provide for recalibration of the viscosity zero value after each defrost. Recalibration is necessary to account for any changes that may occur due to wear of the harvesting motors and associated drive trains and harvesting mechanism that can cause inaccuracies in the zero value set point. Also, recalibration can correct for any initial calibration errors that can occur during original set-up of the machine, for the difference efficiency variables that are known to exist between drive motors of the same type and manufacture, and for other such related variables. It will be appreciated that as a new viscosity zero value is stored in the nonvolatile memory after each defrost it is possible to use the previous number for comparison with the latest zero value. In the present invention, if the latest zero value exceeds a pre-determined margin, the new value will be compensated for by an addition or subtraction of an appropriate value. Thus, the present invention can automatically adjust for wear of the various moving elements that occurs over time so that the viscosity of the dispensed beverage remains the same for a given viscosity setting as the machine ages. In addition, the control of the present invention keeps track of the totals of all recalibrations and will not permit adjustment outside of a predetermined range.

The present invention also includes a plurality of touch pad switches and a display for operator interface with the microprocessor. The operator, through use of the touch pad, may select a desired viscosity value from a range thereof. The electronic control then regulates beverage consistency automatically, as above described, without further requirements of the operator. If a more firm or less firm drink is desired, the operator through use of the touch pad and display selects a higher or lower viscosity value number respectively. Thus, the present invention greatly simplifies the maintaining of a consistent beverage viscosity in a frozen carbonated beverage machine.

The invention herein also includes a diagnose function wherein the touch pad switches provide for incrementing through and energizing various machine subcomponents. Thus, for example, a beater motor or expansion value can be individually selected and briefly pulsed or energized so that the operation thereof can be verified.

The present invention also includes electrical tube heaters wherein the heating element of each heater is releasably held within an outer tubular sealed housing. If a heating element fails, such an element is simply removed from the outer housing tube. In this manner the cost of electric heater replacement is greatly reduced as the cylinder box can remain in the machine and the foam insulation does not have to be disturbed.

A control scenario is also shown that provides for increased efficiency of defrost heater operation. As is understood by those of skill, defrosting of the cylinders is periodically necessary, due to the build up of ice particles. As seen in the prior art, such defrosting is typically done for a preset time period, either automatically according to a predetermined frequency, or manually as such particles are viewed and defrosting is deemed necessary. However, a preset time period may be insufficient in some cases, and overly sufficient in others. If insufficient, the purpose of the defrost is not fully realized. If heating is run beyond the point in time that the particulate matter is melted, excessive energy can be used and potential overheating hazardous situation could occur. Moreover, it has been found that the voltage provided to the beverage machine can vary to the extend that the operation of the heaters can be significantly affected. In particular, the higher the line voltage provided to the machine, the less time is needed for defrost, as the heaters run at a higher temperature. The present invention therefore includes a safety defrost function whereby the control monitors the current in each pair of heaters separately and operates dual relay circuits accordingly to insure the correct current flow therethrough. The dual relays provide for redundant assurance that current flow to the heaters can always be terminated. The safety control also provides for a message display of an error condition and for an audible alarm. Also, the defrost control function of the present invention monitors the line voltage and sets the defrost heating time period accordingly, and monitors the viscosity of the beverage during defrost heating such that when the viscosity substantially equals zero for a preset period of time, defrost is then ended. In this manner, it can be appreciated that defrosting is done in accordance with major variables of line voltage and actual beverage viscosity so the length of defrost can be more accurately controlled.

DESCRIPTION OF THE FIGURES

Further objects, features, and advantages of the present invention will become evident in light of the following detailed description, which description refers to the following drawings, wherein:

FIG. 3 is a schematic representation of a refrigeration system for a frozen carbonated beverage machine.

FIG. 4 shows a perspective view of a freeze cylinder box unit.

FIGS. 9A-9D show a block diagram of the electrical control system of the present invention.

FIGS. 14A-14C show a flow diagram of the safety defrost cycle function of the present invention.

FIGS. 15A-15C show a flow diagram of the display and diagnose control of the present invention.

FIG. 17 shows a diagrammatic representation of the arrangement of FIGS. 9A-9 D, 14A-14C, 15A-15C, and 16A-16B.

DETAILED DESCRIPTION

Figure 1:
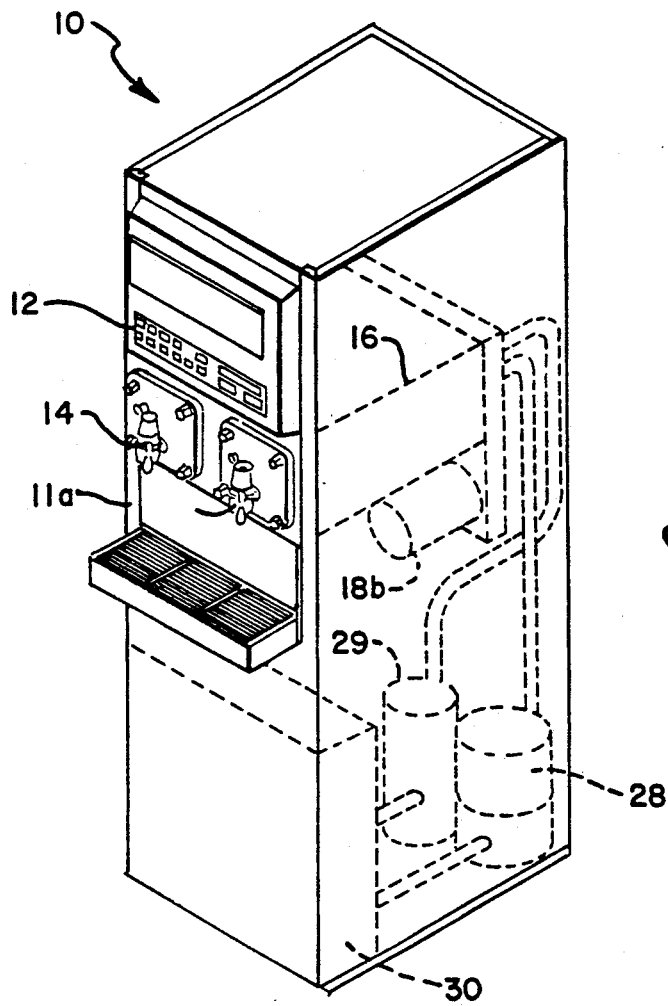
FIG. 1 shows a perspective view of a frozen carbonated beverage machine.
Figure 2:
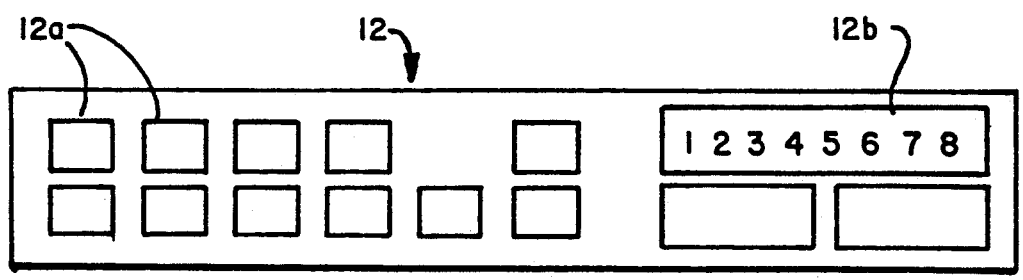
FIG. 2 shows a enlarged detailed view of the control panel of the frozen carbonated beverage machine.

A frozen carbonated beverage (F.C.B) machine, generally designated 10, is seen in perspective view in FIG. 1, and includes an outer housing 11 having a front surface 11a. Surface 11a includes a control panel 12, also seen in FIG. 2, having pressure sensitive switches 12a and a light emitting diode (L.E.D) display 12b. Valves 14 provide for dispensing beverage from machine 10. In describing the present invention a two cylinder F.C.B. machine is illustrated, although such a machine can have various numbers of cylinders.

Referring to FIGS. 3-7, machine 10 includes a cylinder box 16, harvesting assembly drive or beater motors 18a and 18b, for each cylinder 20a and 20b, and refrigeration means. Box 16 contains the two beverage cylinders 20a and 20b, and each cylinder includes a scraper or harvesting assembly having a central axial rod 22, scraper blade support beater bars 24 and scraper blades 26 pivotally secured to beater bars 24.

The refrigeration means includes a compressor 28, reservoir 29, and a condenser 30. Reservoir 29 is connected by a line 31 to electronically pulsed epansion valves 32a and 32b. Expansion valves 32a and 32b control the delivery of refrigerant to coils 33a and 33b respectively. Coils 33a and 33b flow into a common outlet 34 which, in turn, is connected to compressor 28 by line 35. Both coils 33a and refrigerant temperature sensors 36a and 36b respectively, secured to each of the inlets 37a and 37b thereof. A refrigerant temperature sensor 38 is secured to common outlet 34.

Figure 5:
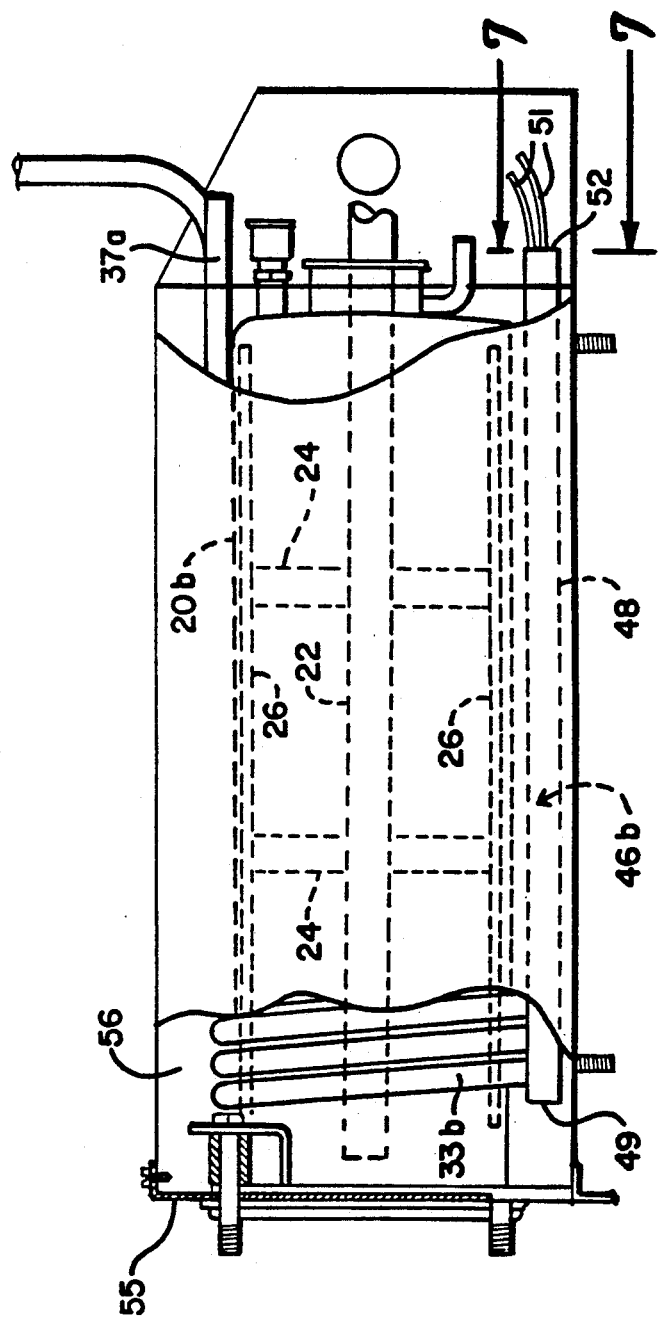
FIG. 5 is a partially cut-away side view along line 4—4 of FIG. 3.
Figure 6:
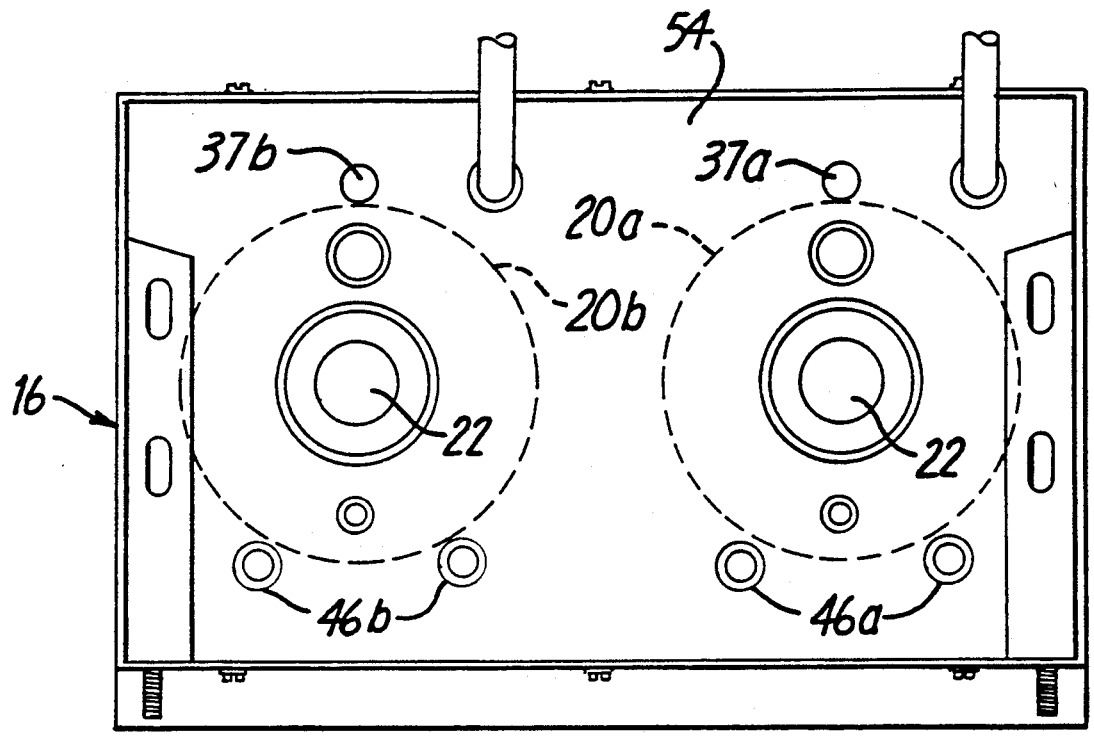
FIG. 6 shows an end view along line 5—5 of FIG. 3.
Figure 7:
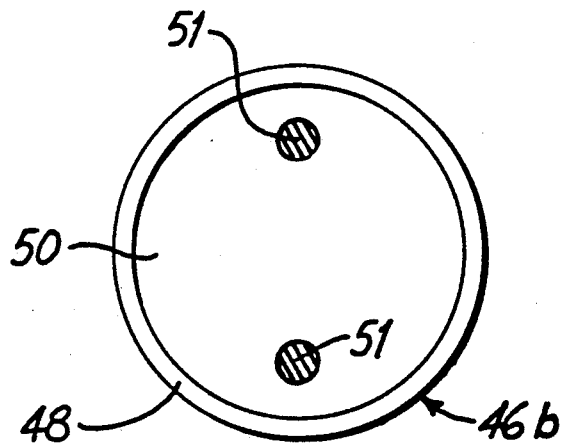
FIG. 7 is an enlarged view of an electrical defrost heater of the present invention along lines 6—6 of FIG. 4.

As is seen in FIG. 5, evaporator coil 33b encircles cylinder 20b, it being understood that coil 33a likewise encircles cylinder 20a. Two pairs of heaters 46a and 46b having stainless steel tube bodies 48 with sealed ends 49, are welded to the individual evaporator coils 33a and 33b respectively. It can be seen by referring to FIG. 5, that heater pairs 46a and 46b are secured to their respective evaporators at positions thereon approximating five and seven o'clock around the perimeter thereof. Each heater 46a and 46b includes a heating element 50 having wires 51 for connection to a source of electrical power. Tube bodies 48 have an inside sized to allow for slideable insertion of elements 50 therein. In addition, it has been found desirable to plate the surfaces of the tubes 48 with copper to provide for improved heat dispersion. Heaters 46a and 46b extend substantially along the entire length of evaporators 33a and 33b and terminate with open ends 52 exterior of rear plate 54 of clyinder box 16 (see FIGS. 5 and 6). As is known in the art, after cylinders 20a and 20b, and associated evaporator coils 33a and 33b, and heaters 46a and 46b are secured to cylinder box front surface plate 55 and rear plate 54, the remaining interior or void areas of cylinder box 16 are filled with a foam insulation 56.

Figure 8:
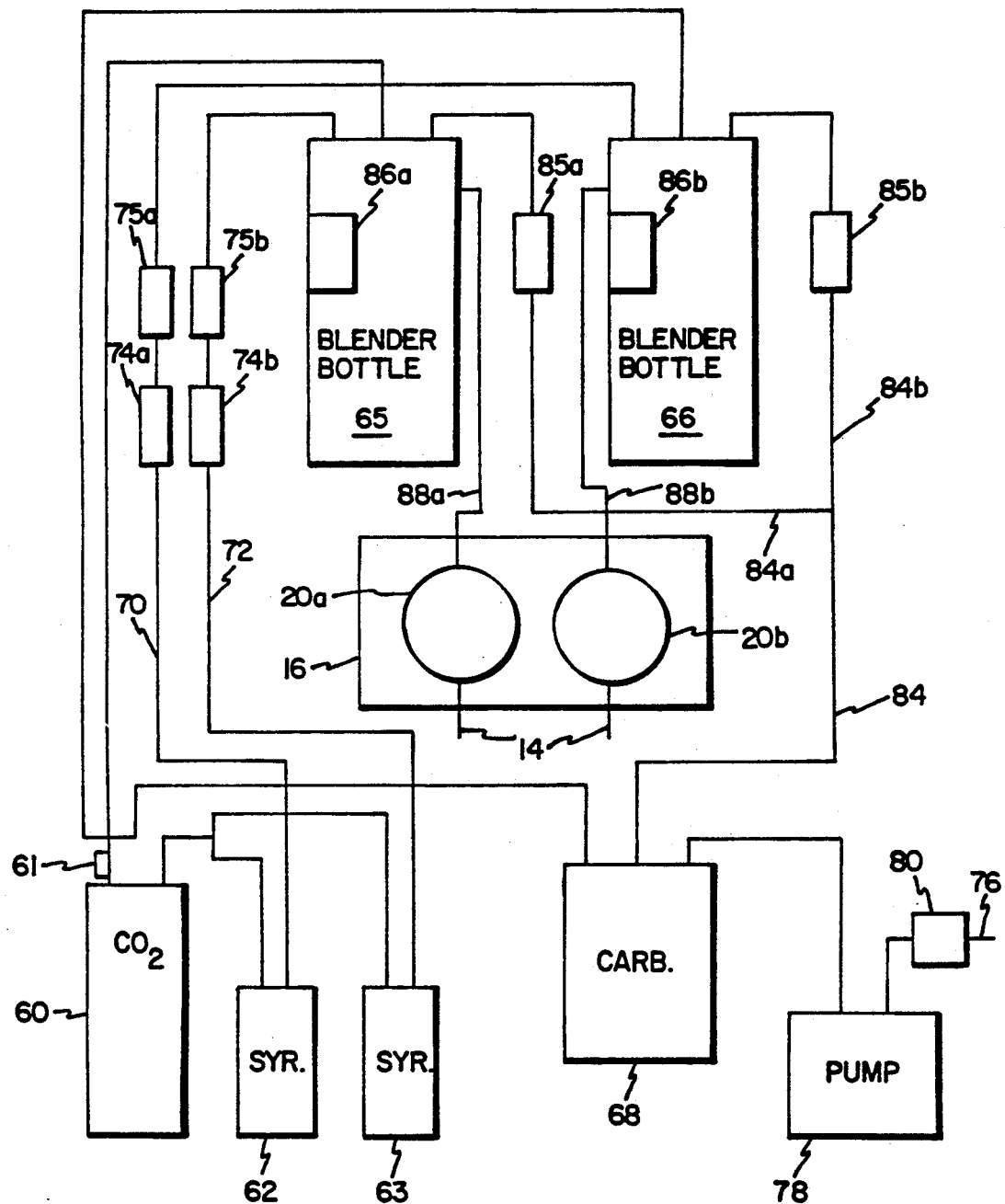
FIG. 8 shows a schematic diagram of the major components of a frozen carbonated beverage machine and their fluid inter-connection.

FIG. 8 shows the basic components of machine 10 in schematic diagram showing their fluid inter-connections. Machine 10 includes a regulated pressurized source of carbon dioxide 60, having a carbon dioxide pressure sensor 61 providing a regulated supply of carbon dioxide to each of syrup tanks 62 and 63, blender bottles 65 and 66, and carbonator 68. Syrup reservoir 62 provides syrup to blender bottle 66 along syrup line 70 and syrup reservoir 63 provides syrup to blender bottle 65 along syrup line 72. Syrup lines 70 and 72 include syrup sold-out float switches 74a and 74b for detecting the presence or absence of syrup and syrup solenoid valves 75a and 76b for regulating the flow of syrup to bottles 65 and 66. A source of potable water, not shown, provides water along line 76 to a carbonator pump 78. Line 76 includes a water pressure indicator 80. Carbonator pump 78 provides a pressurized supply of potable water to carbonator 68 through line 82. As is understood in the art, carbonator 68, in turn, provides a source of carbonated water along line 84 and branches 84a and 84b thereof to blender bottles 65 and 66 respectively. Line 84a and 84b have carbonated water solenoid valves 85a and 85b therein for controlling the flow of carbonated water to blender bottles 65 and 66. Blender bottles 65 and 66 includes beverage level sensors 86a and 86b respectively, and provide a supply of liquid beverage along lines 88a and 88b to freezing cylinders 20a and 20b for freezing therein and ultimate dispensing therefrom by valves 14.

Figure 9A:
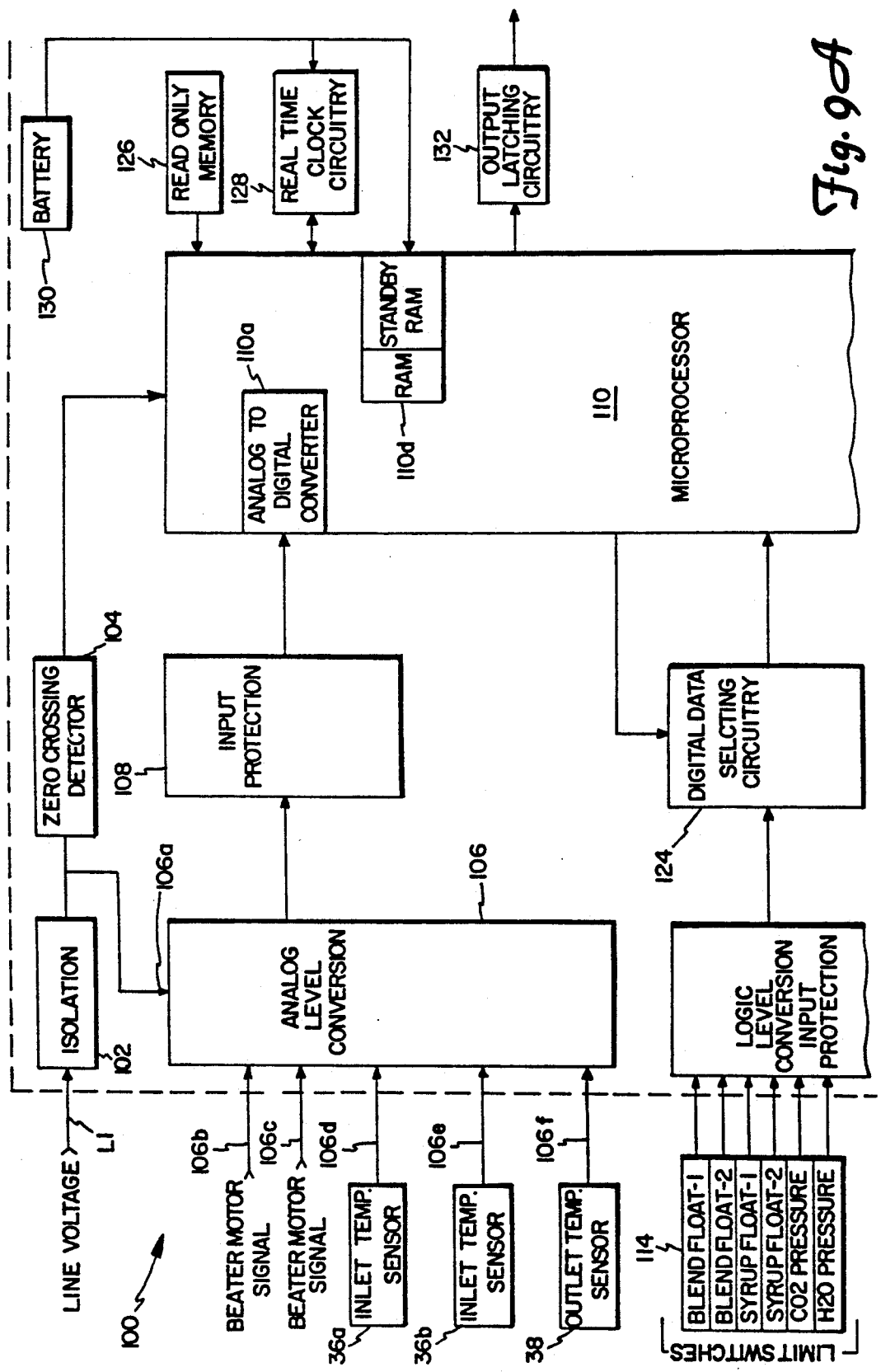
Figure 9D:
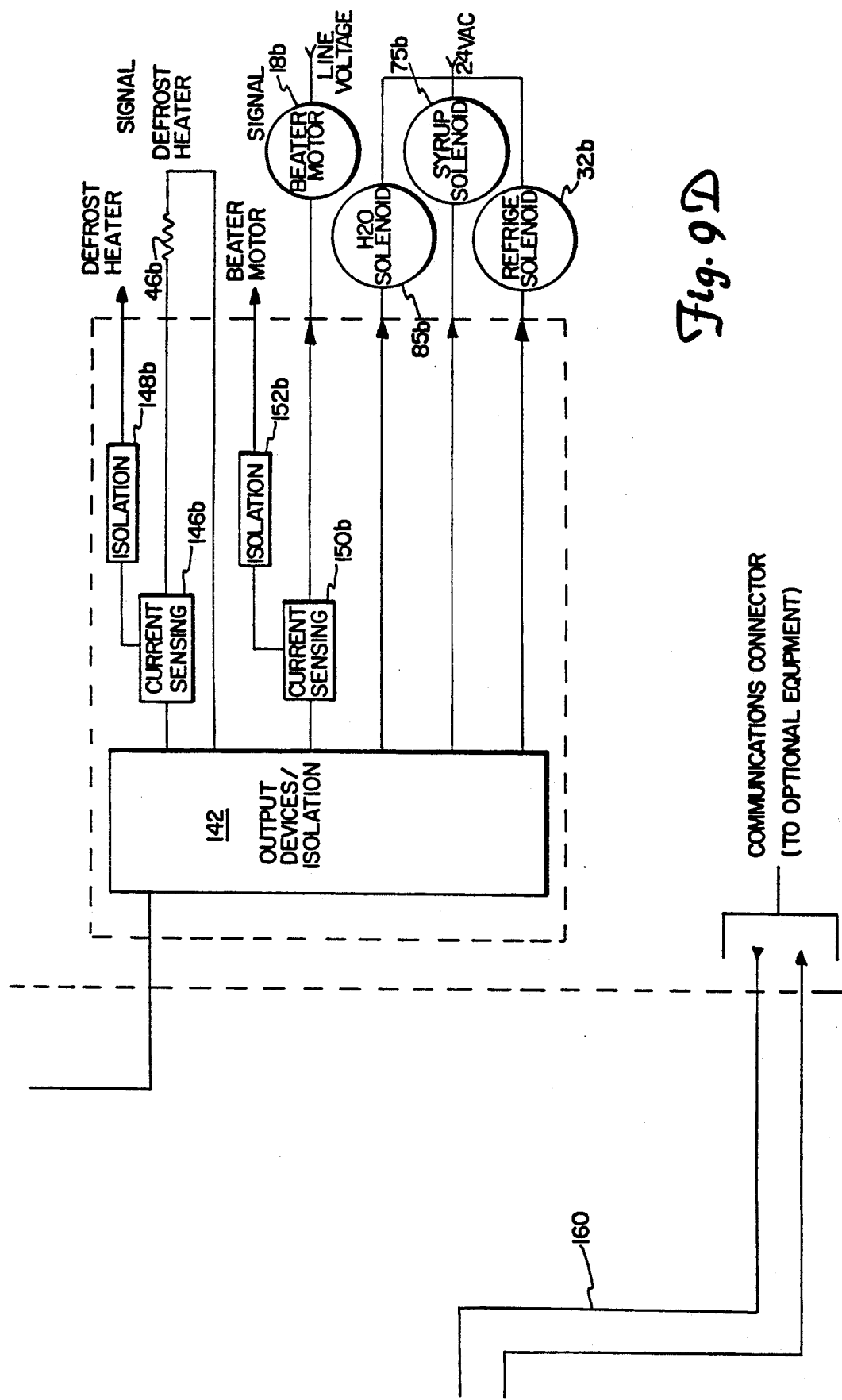

A block diagram of the electronic control of the present invention is seen in FIG. 9, and generally designated numeral 100, and includes two control boards 100a and 100b. It will be understood by those of skill that the various components or circuits of control 100 are well known in the art and, therefore, a detailed description of the specific schematics thereof will not be included herein. Line current is brought in on line to isolation circuit 102 and, in turn, to zero crossing detection circuit 104. Circuit 102 provides for the necessary and step down of voltage from the line voltage of nominally 240 volts AC to the lower voltage required by the components of circuit 100. Circuit 102 provides a voltage signal at input 106a to analog-level-conversion circuit 106. Analog level conversion circuit 106 receives signals at inputs 106b and 106c from each motor 18a and 18b and receives signals at inputs 106d and 106e from inlet temperature sensors 36a and 36b, respectively, and receives signals at input 106f from outlet temperature sensor 38. The signals from level conversion circuit 106 are sent to input protection circuit 108 and from there are communicated to the analog digital converter 110a of microprocesser 110. Zero-crossing or sync circuit 104 is connected directly to processor 110 and provides information regarding the phase difference between the voltage at input 106a and current at each input 106b and 106c. Microprocessor 110 is a high density complementary metal-oxide integrated circuit identified as MC68HC11A1 made by Motorola and includes the on chip capabilities of an eight channel analog-to-digital (A/D) convertor 110a having eight bits of resoulution, a synchronous serial communications interface 110b, 8K bytes of read-only memory (ROM), not shown, 512 bytes of electrically erasable programmable ROM (EEPROM) 110c and 256 bytes of random-access memory (RAM) 110d, and is capable of addressing 64K bytes of external ROM.

Control 100 further includes a logic level conversion input protection circuit 112 receiving inputs from limit switches 114, user interface switches 12a, dip switches 118, and inputs 120a and 120b, representing signals from defrost heater pairs 46a and 46b respectively. Circuit 112 is connected to digital data selecting circuitry 124 that, as is known in the art, serves to protect processor 110 and regulate the flow of information thereto. A read-only memory 126 is connected to microprocessor 110 and provides additional ROM storage. A real time clock 128 is connected to processor 110 and includes a battery 130. Processor 110 is also connected to output latching circuitry 132 which, in turn, is connected to output protection/driver circuitry 134. As will be appreciated by those of skill, output latching circuitry 132 and protection/driver circuitry 134 provide for safe and efficient connection to output isolation circuitry 136, display board 12b, output isolation circuitry 140 of output board 100a and output isolatio circuit 142 of output board 100b and audible alarm 135.

Isolation circuit 136 provides for safe connection to the higher voltage carbonator pump 78 and compressor 28. The connection to compressor is indirect through compressor contactor or relay 144.

Display board 12b, as understood by those of skill, includes input protection, and display decoder circuitry, 145a and 145b respectively, connected to an alpha numeric eight digit LED display 145c.

It will be appreciated by those of skill that the boards 100a and 100b relate to the control of various components associated with cylinders 20a and 20b and are indentical in that regard. Output isolation circuit 140 is connected to a current sensing circuit 146a, which circuit is connected in series with defrost heaters 46a. Current sensing circuit 146a is connected to an isolation circuit 148a for providing the signal to input 120a. Circuit 140 is also connected to current sensing circuit 150a which, in turn, is connected to beater motor 18b for sensing the current use thereof. Isolation circuitry 152a is connected to circuit 150a so that the beater motor current signal can be safely supplied to input 106b of analog level conversion circuitry 106. Output device/isolation circuit 140 provides control signals to refrigeration expansion valve 32a, carbonated water supply valve 85a and syrup valve 75a. In board 110b, output isolation circuit 142 is connected to a current sensing circuit 146b, which circuit is connected is series with defrost heaters 46b. Current sensing circuit 146b is connected to an isolation circuit 148b for providing the signal to input 120b. Circuit 142 is also connected to current sensing circuit 150b which in turn, is connected to beater motor 18a for sensing the current use thereof. Isolation circuitry 152b is connected to circuit 150b so that the beater motor current signal can be safely supplied to input 106c of analog conversion circuitry 106. Output decice/isolat circuit 142 also provides control signal to refrigeration expansion valve 32b, carbonated water supply valve 85b and syrup valve 75b.

Serial port 110b of microprocessor 110 is connected to lines 160 and 162, each having respectively input and output protection circuits 163 and 164, for providing communications to external equipment, such as a personal computer. Dip switches 118 provides for alternating between various pre-programmed messages that are shown, if desired, on display 12b. Microprocessor 110 is also connected to a power supply monitoring and reset circuitry 166.

Figure 10:
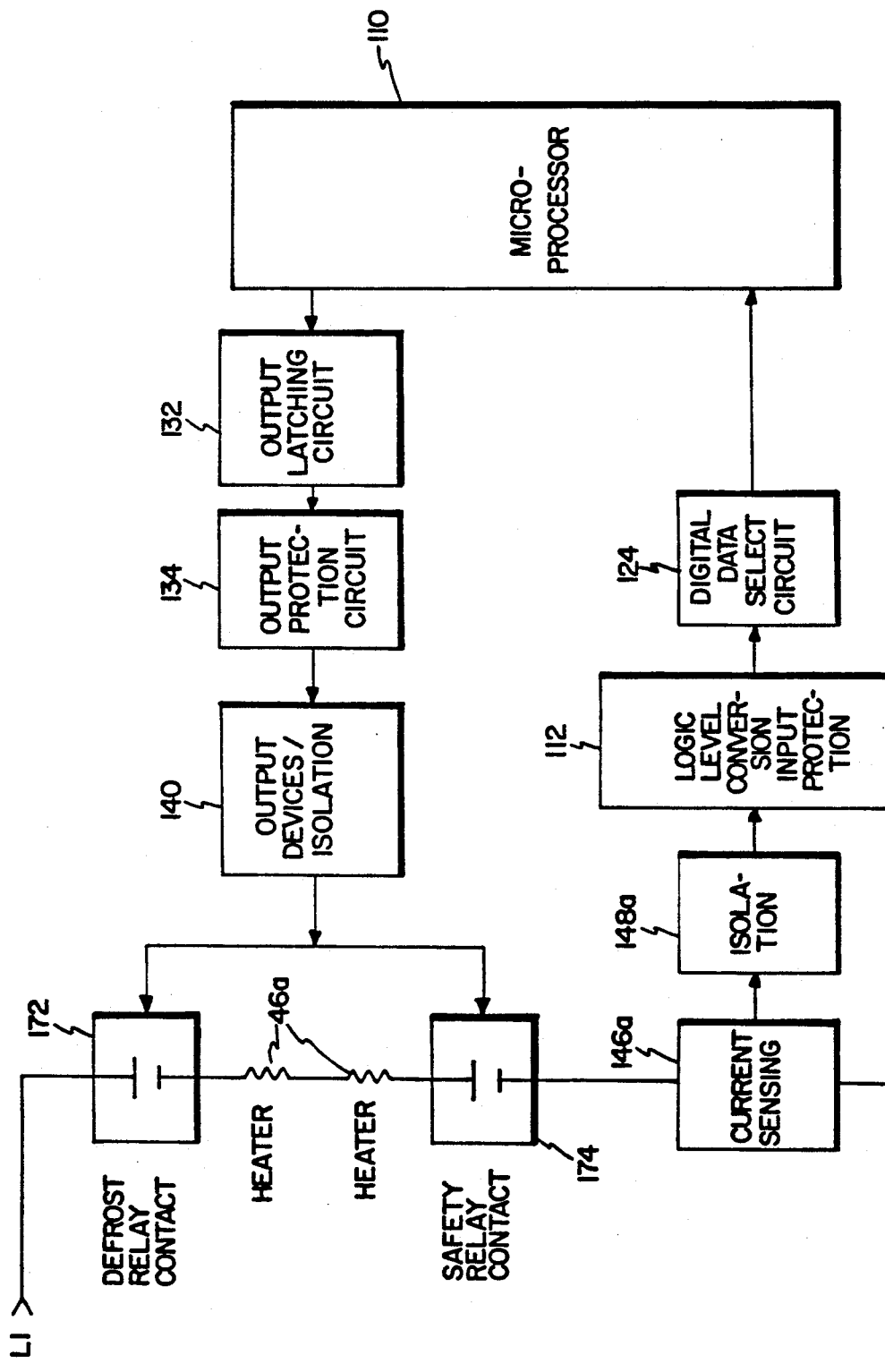
FIG. 10 shows an electrical schematic of the heater safety circuit of the present invention.

As seen in FIG. 10, a further detailed view of the manner of connection of heater pair 46a to a 240 VAC power source and to processor 110 is shown. For the purpose of efficiency of description of the present invention, the connection of heaters 46a is shown, it being understood that the connection of heaters 46b is the same. Heaters 46a are connected in series to a source of 240 VAC, lines L1 and L2. Current sensing means 146a is also connected to lines L1 and L2 along with a normally open relay defrost switch 172 and a normally open safety defrost relay switch 174. Sensor 146a, as previously described, is connected to processor 110, through isolation circuit 148a, conversion input protection circuit 112, and selecting circuit 124, and relays 172 and 174 are connected to processor 110 through isolation circuit 140, protection circuit 134 and latching circuit 132.

Control 100 provides for the periodic and continuous determining of the beverage viscosity in cylinders 20a and 20b. As is known in the art, viscosity is determined as a function of the power or torque consumption experienced by each motor 18a and 18b individually, wherein an incersaing torque reading indicates an increasingly viscous beverage, as greater power is required to maintain a constant stirring rate of the harvesting mechanism. Various electro-mechanical and electronic strategies have been employed to determine the power consumption or torque experienced by an electric motor. Control 100 employs an electronic approach in accordance with equation $P = E \times I \times COSINE\ O$, i.e. where power (P) is equal to the product of the voltage (E) times the current (I) times the cosine of the angle (O) of the phase difference between the voltage and current. Zero crossing or sync circuit 104 provides the phases difference information, and isolation circuit 102 includes a voltage detection circuit means, not shown, for determining voltage, that signal being provided at input 106a. The current is determined from input 106b and 106c from motors 18a and 18b individually. Thus, processor 110 receives the information necessary for determining the power consumption of each motor 18a and 18b separately. Processor 110 is an 8-bit microprocessor; however chips of larger computational ability, such as 16 or 32 bit microprocessors could also be used. An 8-bit processor currently provides for a cost savings, however is disadvantaged by reduced computational speed in compraison to larger processors. Thus, as is done in the present invention, and as is known in the art, lock-up tables pf pre-defined information are preferably used as a means to reduce the computational load on the microprocessor.

Figure 11:
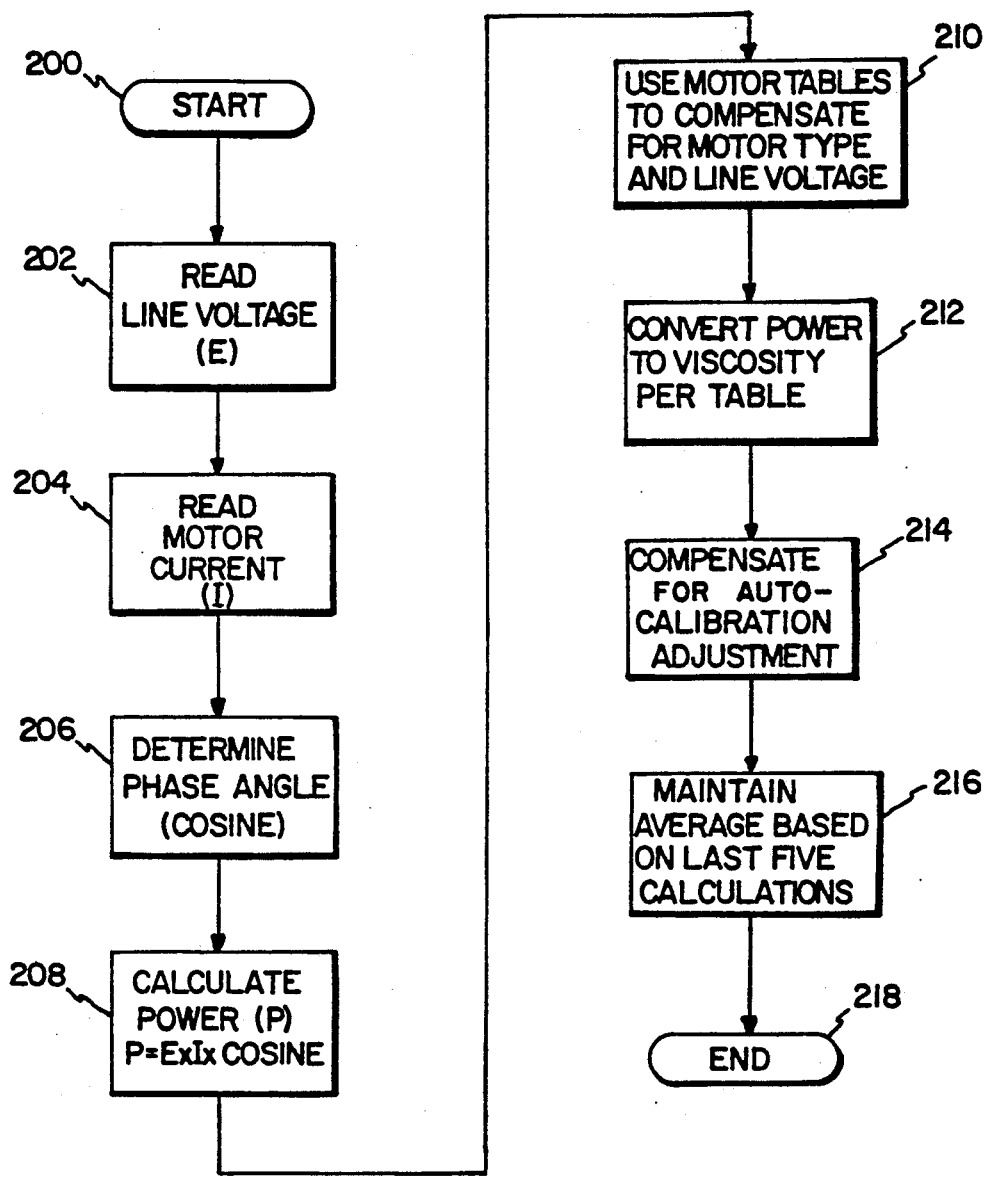
FIG. 11 shows a flow diagram of the load sensing function of the present invention.

A more thorough knowledge of the manner of viscosity sensing in the present invention can be had by reference to FIG. 11, wherein the functional programming steps related thereto as shown. As seen therein, after a start point (block 200) power is calculated and monitored by microprocessor 110 by first reading the line voltage provided at input 106a (block 202) reading the motor current provided by outputs 106b and/or 106c, depending upon which beater motor load is being determined (block 204) and determining the phase angle (block 206) as supplied by zero crossing circuit 104. Power is then calculated by processor 110 as the product of these three variables (block 208).

It will be understood that electrical motors vary as to their efficiency of converting electrical energy to the kinetic energy of motion, which in the present invention is the movement of the harvesting mechanism and related drive train components. Such efficiency depends upon the line voltage and the particular type of motor being used. In the present invention, motors 18a and 18b are rated at ¼ horsepower, and are made by General Electric. The efficiency motor curves therefor are determined by experimental application of various voltage over the anticipated voltage range. The results of such tests provide for efficiency curve information which is stored in tabular form within Rom 126. Thus, after calculation of the power the table is used to compensate for the motor efficiency based upon the sensed line voltage (block 210). The power valve is then converted to a "gross" viscosity value (block 212) as per a second table stored in ROM 126 providing the relation between the recalculated power consumption and a corresponding viscosity whole number. In a preferred embodiment of the present invention, power consumption ranges typically from 100 to 300 watts, and is converted to an arbitrary viscosity scale running fron −9 to 99, with the zero value of the scale representing the load when the beverage is completely liquid. Such a viscosity scale provides for a one or two digit whole number that is easy to use and easily diplayed. The viscosity number is further refined by the auto-calibration function (block 214), described in greater detail below.

By way of example, if the "gross" or initial power consumption of a motor 18 was calculated to be 200 watts, such figure would then have to be compensated for. Thus, if the motor were 90% efficient at the particular sensed voltage, the load value would be reduced to 180 watts, as determined from the data in the motor curve table. The resultant number would be converted to the viscosity scale by use of the second table, to a viscosity of, for example, 1. If the amount of the auto-calibration were a −1, then the resultant "net" or adjusted viscosity would be 0. As indicated in box 216, the final viscosity reading (block 218) is based upon the average of five previous calculations.

Figure 12:
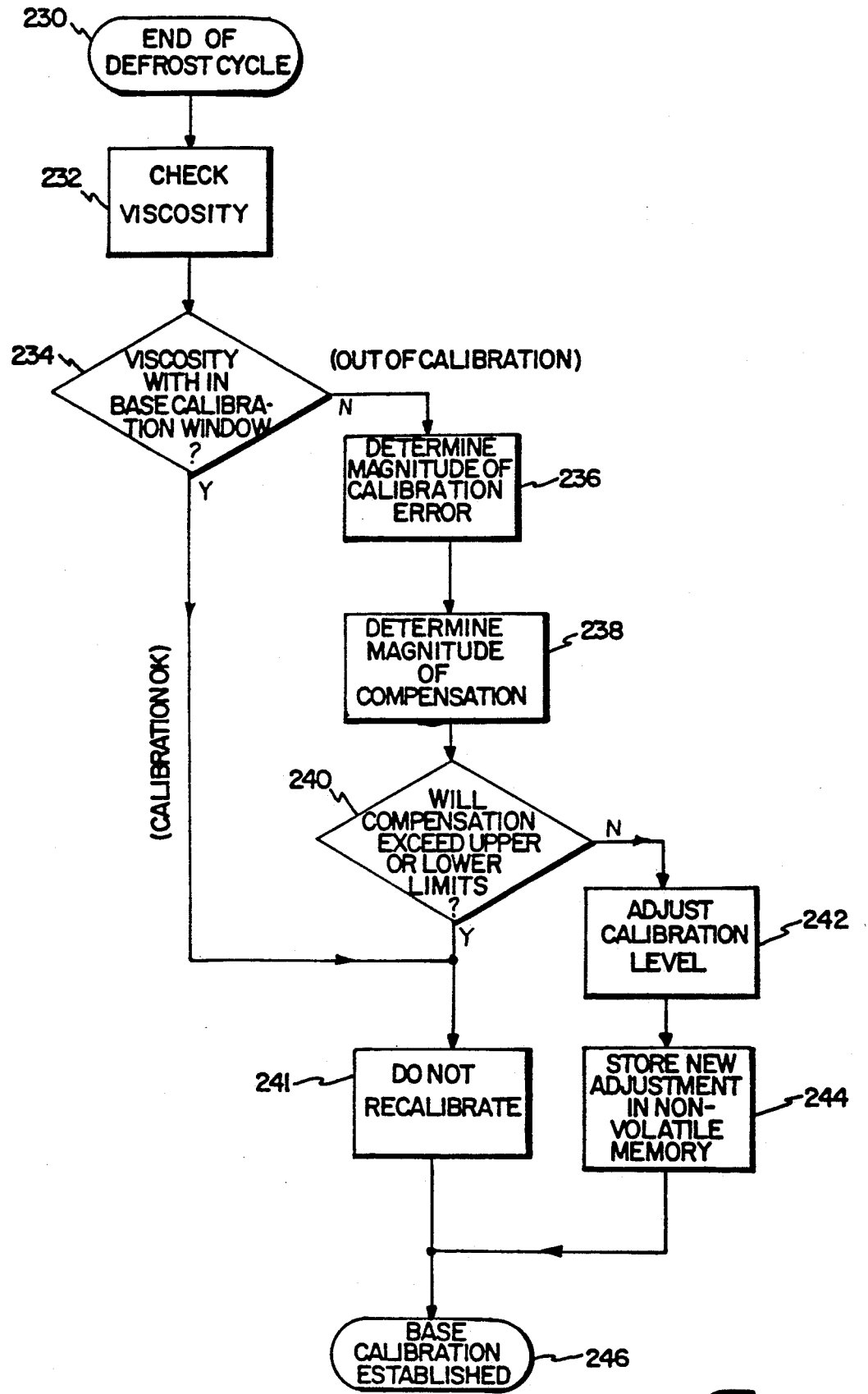
FIG. 12 shows a flow diagram of the recalibrating function of the present invention.

The present invention provides for recalibrating of the zero viscosity set point for each cylinder 20a and 20b. It can be understood that at the end of each defrost cycle the beverage is completly liquid and, therefore, provides a point in time at which beverage viscosity is known to be zero. Thus, the only drag on a harvesting drive motor results from the resistance contributed by the motor itself, the friction of the harvesting assembly moving against the beverage cylinder walls, and any friction inherent in the drive train means connecting each motor to its corresponding scraping assmebly. Therefore, changes over time in such cumulative load above or below the original setting, can be compensated for by the recalibration program of the present invention. The manner of re-referencing a new zero point can be understood by referring to the functional flow diagram thereof, as seen in FIG. 12. At the end of a defrost cycle (block 230) the viscosity value of the last defrost cycle (block 232) is obtained. If the difference between the new viscosity value and zero exceeds a base calibration window setting, (block 234), calibration is necessary. The overall difference between the old and new viscosity readings is determined in block 236, after which a decision is made as to the magnitude of the recalibration (block 238). At decision block 240 it must be determined whether or not the proposed recalibration would result in the calibration adjustment exceeding a pre-determined range. It can be understood that recalibration should not be permitted beyond a certain limit, as a very low or high resistance relative to the original sitting may be indicative of mechanical failure wherein an attempt to recalibrate to such a level could be deleterious to the machine or create a hazardous situation. In the present invention the recalibration range is plus or minus 20 viscosity points from the original set-point. If the proposed adjustment is outside of that range no recalibration is done (block 241). If the adjustment is acceptable, the adjustment is made (block 242), and the amount thereof is stored in EEPROM 110c or standby RAM 110d, (block 244). The new zero point is then established (block246). A better understanding of the recalibration function can be had by way of numberical examle, wherein if the original set point is zero, the recalibration window is 3, and upon subsequent defrost the viscosity reading is 5, then the difference there between exceeds 3 and recalibration should be done. The total difference is, of course 5, and the magnitude of the adjustment can be a set figure, such as 1, or can be variable over a set range of, for example, up to 5 viscosity points. Thus, if the magnitude of change allowable is from 1 to 5, and the adjustment value selected is the maximum possible, 5, then the adjustment would be minus 5 to reduce the set point again two zero. The amount of change, −5, is stored in EEPROM 110c. At the next defrost cycle, if the viscosity reading is 5, relative to the new set point, the same procedure follows wherein a −5 change is affected. The adjustment number saved in EEPROM 110c, however is not −5 but the total of all adjustments, in this case −10. This stored adjustment number is the cumulative or running total of the amount of each recalibration done at block 242. It can now be appreciated that it is the stored adjustment number that is locked at in block 240 whereby the determination is made whether or not the acceptable calibration range of plus or minus 20 has been exceeded. It will be understood by those of skill, that may variations to the recalibration software can be made to tailor operation to a particular set of circumstances. The magnitude of adjustment can be set at a constant small value if conservative adjustments are deemed desirable. In the present invention, viscosity is controlled in accordance with a three level system as seen in chart A, below.

CHART A

| Low | Middle | High |
| --- | --- | --- |
| 7 | 12 | 16 |

CHART A-continued

| Low | Middle | High |
|-----|--------|------|
| 8   | 14     | 18   |
| 9   | 16     | 20   |
| 10  | 18     | 22   |
| 11  | 20     | 24   |
| 12  | 22     | 26   |

Figure 13:
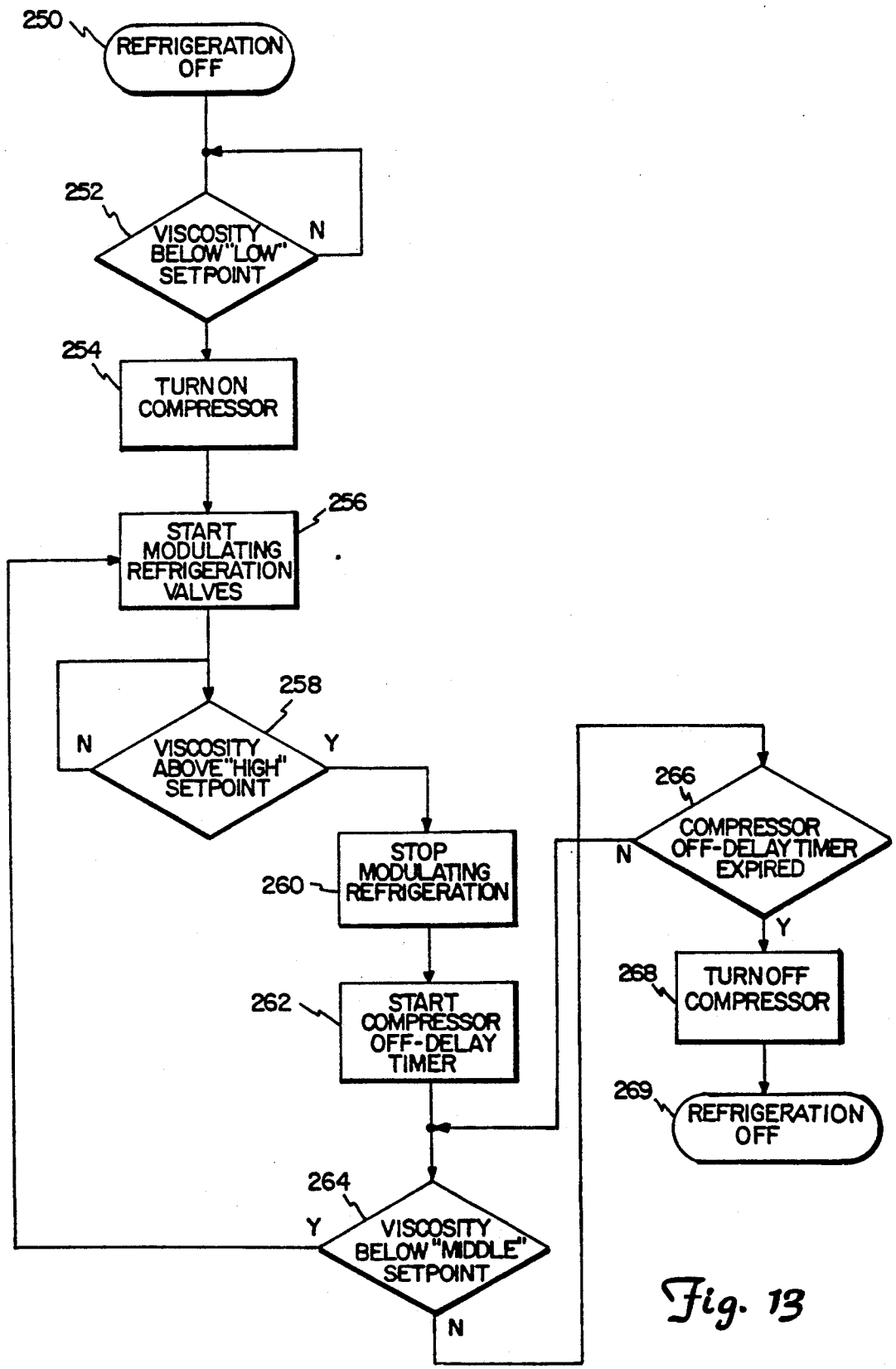
FIG. 13 shows a flow diagram of the viscosity control of the present invention.

The low numbers represent the viscosity setting normally displayed and selectable by the operator of machine 10, each setting representing a predetermined set of three viscosity numbers. Thus, if a viscosity of 9 is selected, the corresponding middle number would be 16 and the high number 20. The manner of the control of the viscosity in a cylinder of machine 10, cylinder 20a in this example, can now be understood by reference to FIG. 13, showing the functional flow of the programming of the present invention relating to viscosity control. Assuming refrigeration is off (block 250), processor 110 will be continually and periodically determining viscosity (block 252), as descirbed above. If the viscosity is below the selected low setting, 9 for example, compressor 28 will be turned on (block 254) and valve 32a will begin to modulate (block 256), thereby sending refrigerant through coil 33a resulting in the cooling of the beverage in cylinder 20a. Such cooling will continue as long as the sensed viscosity is below the high setting of 20 in this example (block 258). Once the sensed viscosity equals or exceeds the high number, the modulating of expansion valve 32a will be stopped (block 260), thereby discontinuing the freezing of the beverage within cylinder 20a. However, compressor 28 continues to run. A twenty-second timer commences at the stopping of the modulating of valve 32a (block 262). Discontinuing modulating, i.e., closing of normally closed valve 32a, terminates the freezing of further beverage. Thus, it can be understood that the resultant scraping load on motor 18a will be quickly eliminated, wherein any further load value in excess of the zero point will be due solely to the viscosity of the beverage. If such viscosity reading goes below the middle value, 16 in our example, prior to the expiration of the twenty-second time period, expansion valve 32a will again start to modulate causing further refrigeration of cylinder 20a (block 264). The twenty-second clock will be reset each time the viscosity goes below the middle value and the refrigeration valve 32a is again modulated. This loop will continue unless and until the viscosity stays above the middle value for the entire twenty-second time period (block 266). If the twenty-second clock expires and the viscosity remains above the middle set value, compressor 28 will then be turned off (block 268), stopping refrigeration (block 269). Compressor 28 will be turned on again and valve 32a modulated once the viscosity is seen to go below the low set point. Valves 32a and 32b are modulated on the basis of the temperature difference between each inlet 37a and 37b and common outlet 34. Thus, sensors 36a, 36b and 38 provide such temperature information to processor 110 so that valves 32a and 32b provide for the proper flow of refrigerant. Various pulse modulating strategies are known in the prior art. In the present invention, processor 110 samples the inlet and outlet temperature difference of each coil 32a and 32b every ten seconds. The on-time, or length of any pulse, is related to the temperature difference, wherein the greater the difference, the longer the valve is held open. Whereas, the expansion valve off-time is set at 0.5 seconds. A representative example of such a relationship is seen in Chart B, below, relating to single cylinder operating wherein the expansion valve is modulated at a base rate of 62% for a fixed period of 30 seconds. Chart C, below, shows such data relating to the refrigeration of both cylinders simultaneously wherein both valves are modulated at a base rate of 37% for a fixed period of 30 seconds.

CHART B

| Temperature Difference Inlet/Outlet | On-Time (Miliseconds) | Percentage On |
|---|---|---|
| Less than 0 | 509 | |
| 1-5 | 150 | 23% |
| 6-10 | 300 | 37% |
| 11-15 | 600 | 54% |
| 16-20 | 700 | 58% |

CHART C

| Temperature Difference Inlet/Outlet | On-Time (Miliseconds) | Percentage On |
|---|---|---|
| Less Than 0 | 255 | |
| 1-5 | 50 | 9 |
| 6-10 | 100 | 17 |
| 11-15 | 250 | 33 |
| 16-20 | 300 | 37 |

In this manner, the present invention provides for very accurate control over the viscosity of the frozen beverage of the use of a particular control scenario wherein the sensed load on a beater motor in excess of a zero value is due to the degree of viscosity of the beverage alone, the other load components having been factored out. In addition, the three level system in combination with the control program serves to insure that the beverage is "truly" at the desired viscosity before the compressor is turned off, thereby preventing harmful short-cycling thereof. It will be appreciated by those of skill that the values of table A are determined upon the basis of the desired degree of control of the acceptable range of viscosity for the particular setting. The viscosity range for a particular setting is the difference between the corresponding low and high numbers. Moreover, it will be understood by those of skill, that the values of table A and the numerical data of the first and second tables relating to efficiency curves and power to viscosity conversion, are highly dependent upon many variables, such as the particular beater motor used, the size of the freezing cylinders, and the like. Thus, it will be appreciated that such numbers must be experimentally determined for each particular application.

Figure 14B:
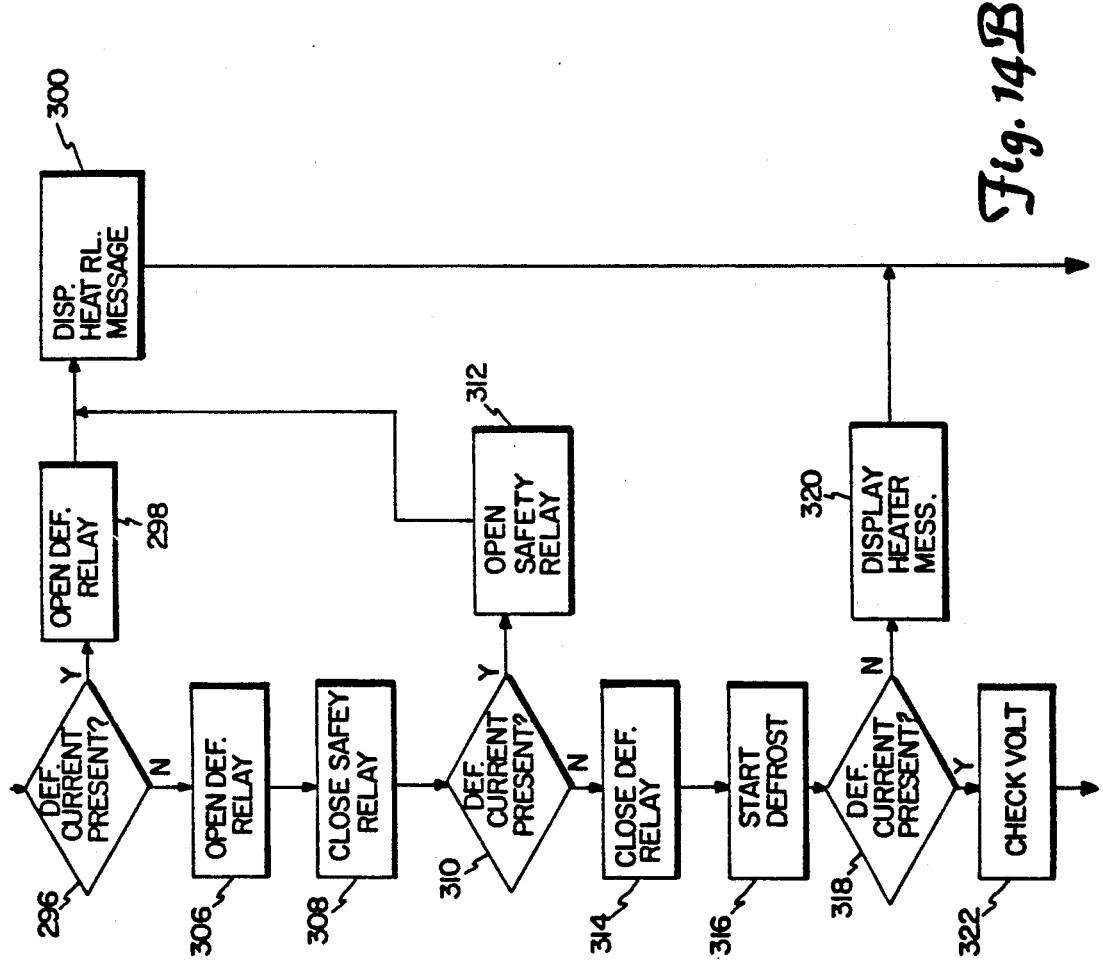
Figure 14C:
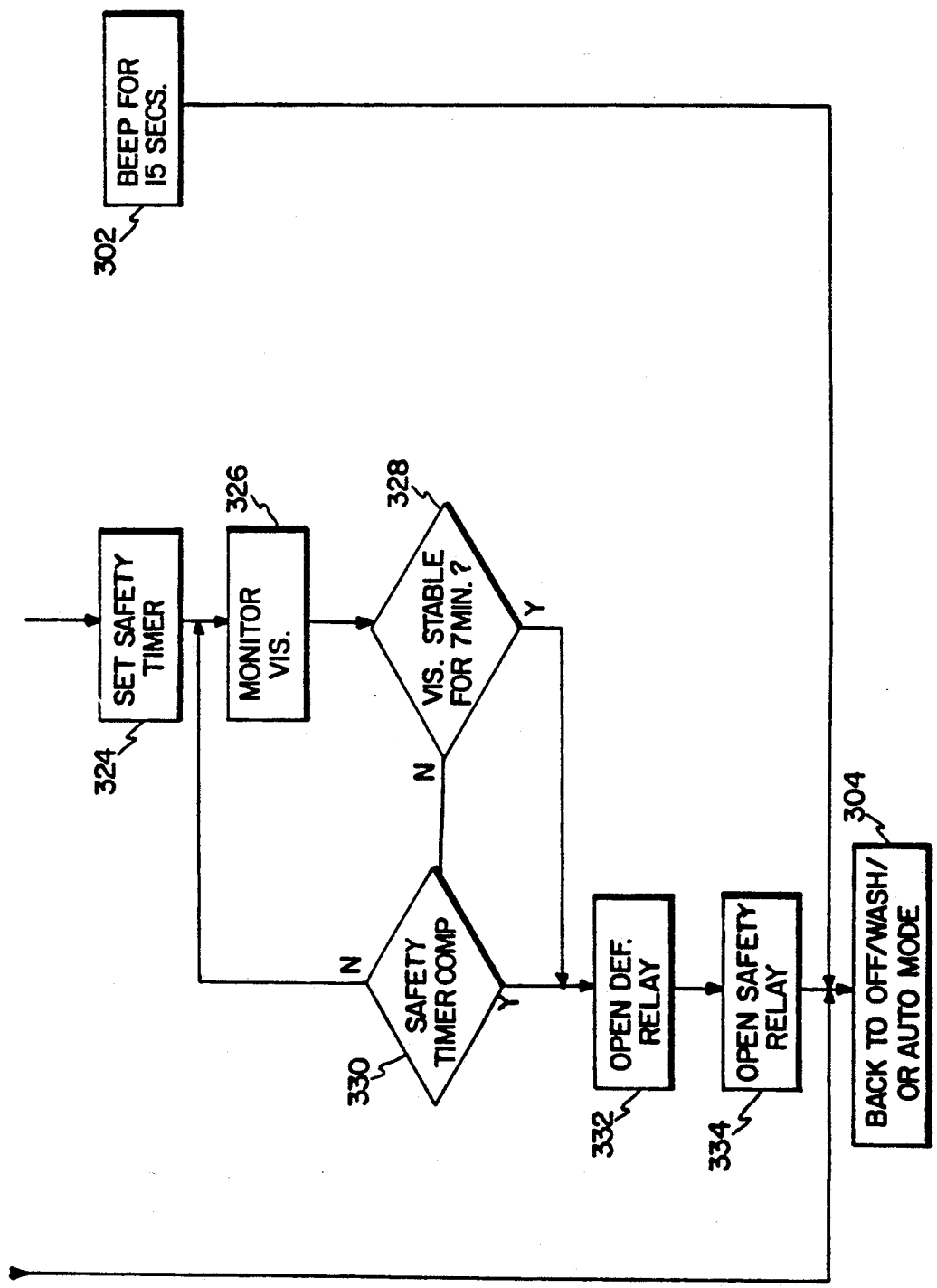

An understanding of the safety defrost function of the present invention can be had by referring to the schematic diagram of FIG. 10 and the function flow diagram, as seen in FIG. 14. At block 270, F. C. B. machine 10 is in a particular mode, such as "off", "wash", or "auto". In any such mode, both relay contacts 172 and 174 are open and the output of sensor 146a is continually looked at to see if current is present (block 272). If current is present, even though both relays 172 and 174 should be open, it is clear by review of FIG. 10, that a dangerous fault condition exists. Therefore, an "unplug" message is shown in display 12b (block 274) and alarm 143 is sounded continuously (block 276). If no such current flow is detected, defrost can be selected manually by use of a specific display switch 12a, therefor, or can be initiated automatically based upon a preprogrammed defrost time (block 278). When the defrost cycle is started, refrigeration is first initiated (block 280) and viscosity is monitored (block 282), as previously described. At decision block (284) the viscosity is monitored to determine whether or not it has reached whatever the set viscosity is at that time. If the viscosity has not reached the set viscosity, decision block (286) determines whether or not the refrigerant timer has expired. If not, the loop continues wherein viscosity is monitored until, as seen in FIG. 14, either the set viscosity is reached or the refrigeration timer times out. If the refrigeration timer times out prior to the set viscosity being reached, 30 minutes in the present invention, a refrigeration error situation has occurred (block 288) and a beeper is initiated for a period of time, for example 15 seconds (block 290) and the machine is returned to an off, wash or auto mode (block 292). However, if the set viscosity is first reached, the program proceeds to close the defrost relay 172 (block 294) after which a flow of current is checked by sensor 146 (block 296). It can be appreciated by review of FIG. 10 that, if both relays 172 and 174 are open, yet current is sensed upon the closing of only relay 172, a potential hazard situation exists. Thus, relay 172 is opened (block 298), an error message is displayed (block 300) indicating a relay problem, after which the alarm is sounded for 15 seconds (block 302). Machine 10 is returned to the original mode (block 292) after completion of defrost timer (block 304). If, after the closing of defrost relay 172, no current is sensed (block 294), defrost relay 172 is reopened (block 306), after which safety relay 174 is closed (block 308). If current is again detected (block 310), safety relay 174 is opened (block 312), thus leading to the same error message and alarm as, again, a hazard situation may exist. Thus, it can be seen that the control of the present invention provides for independent testing of each relay 172 and 174. If, after testing of each relay, no unexpected current flow is detected, defrost relay 172 is closed (block 314) and defrost heating is started (block 316). Defrost current is again sensed (block 318) and if such current does not exist, a message will be displayed (block 320) indicating a lack of heat or heater error, whereupon alarm 143 will be sounded for a period of time, such as 15 seconds (block 302). If current exists at block 318, the line voltage to beater motors 18 is sensed and a safety timer is set accordingly (blocks 322 and 324). Microprocessor 110 includes look-up tables defining the length of the safety timer setting as correlated with variations that often occur in line voltage. It has been found that, as the line voltage supplied to beverage machine 10 is increased, the length of the defrost time can be proportionally decreased, due to the higher heat resulting from the increased voltage. Those of skill in the art will appreciate that the particular relationship is variable depending upon heater motor size, heater wattage, cylinder volume, and so forth. In the present invention, four levels are set: the defrost time is 21 minutes at 207 volts and below; 19 minutes at 208-229 volts; 16 minutes at 230-250 volts; and 14 minutes at voltages greater than or equal to 251 volts. During heating, the viscosity is monitored (block 326). At (block 328), if the viscosity is found to be substantially stable for a pre-set time period, thus indicating complete defrosting and a liquid beverage, the defrost relay and safety relay are opened (blocks 332 and 334) and the machine is returned to the off, wash or auto mode (block 292). If viscosity has not been substantially stable for the pre-set time period, 7 minutes in the present case, the safety timer is checked for completion (block 330). If the safety timer has not expired, the cycle continues through blocks 326 and 328, for as long as either the safety timer has not run out or the viscosity has not been stabilized for the pre-set time period. If the answer is 'yes' with respect to either of decision blocks (328) and (330), it can be seen that the defrost cycle is either completed or, with respect to the safety timer, should be ended, as it can be understood that the safety timer then prevents the defrost heater from running for too long a period of time.

As is known in the art, touch switches 12a, as specifically listed and named in FIG. 9, are used to control the operation of machine 10, such as to initiate refrigeration, start a defrost cycle and the like. As in also understood, switches 12a can be use to obtain information concerning the current operating status of its various components. Machine 10 includes a display mode wherein such information can be accessed, and wherein certain functions of the machine can be programmed. The present invention also provides for a diagnose function in addition to a display function. The operation of the display and diagnose functions can be understood by referring to FIG. 15. At any time during the operation of machine 10 (block 320), switches 12a are used to enter the display mode (block 322). Thus, various display functions can be selected by incrementing through and individually selecting the one of interest. The particular switch or switches used for entering the display mode and for incrementing and selecting is arbitrary and well within the skill of the art and, therefore, in the interest of efficiency of description herein, need not be explained in detail. The display functions are: diagnose (block 324), defrost (block 326), time (block 328), sleep (block 330), wake up (block 332), viscosity set (block 334), vicosity read (block 336), sensors (block 338) and voltage (block 340). If the particular block 324-340 is selected, then the related message is displayed and the opportunity for a new setting adjustment, or display of an operating status message, is provided (blocks 342-356). As control 100 includes a clock 128, the selection of the time function permits the setting thereof and the display of the current time. The selection of the sleep and wake-up functions permit the setting and display of individual times at which it may be desirable to have machine 10 automatically turn off and subsequently to turn on so that refrigeration does not occur during times of predictable inactivity. Selection of the defrost function permits the programming and display of times during the day at which the automatic initiation of a defrost cycle is desired. In the present embodiment, for example, up to nine different defrost times are permitted, with a minimum of 2 hours between any two defrosts. In addition, the programming of control 100 does not permit the simultaneous defrosting of both cylinders, so that dispensable beverage is always available from at least one cylinder. The viscosity set function allows the selection and display of the particular viscosity setting from 7 to 12, as per Table A herein. The viscosity read function allows the individual display of the actual viscosity reading of each cylinder. The sensors function permits the separate display of the temperatures at both inlets 37a and 37b as indicated by sensors 36a and 36b, and of outlet 34 as indicated by sensor 38. Selection of voltage function allows the display of the voltage of lines L1 and L2. A particular switch 12a is designated to back-up out of the menu mode represented by block 357 to exit to the original operating mode (block 358).

Figure 15B:
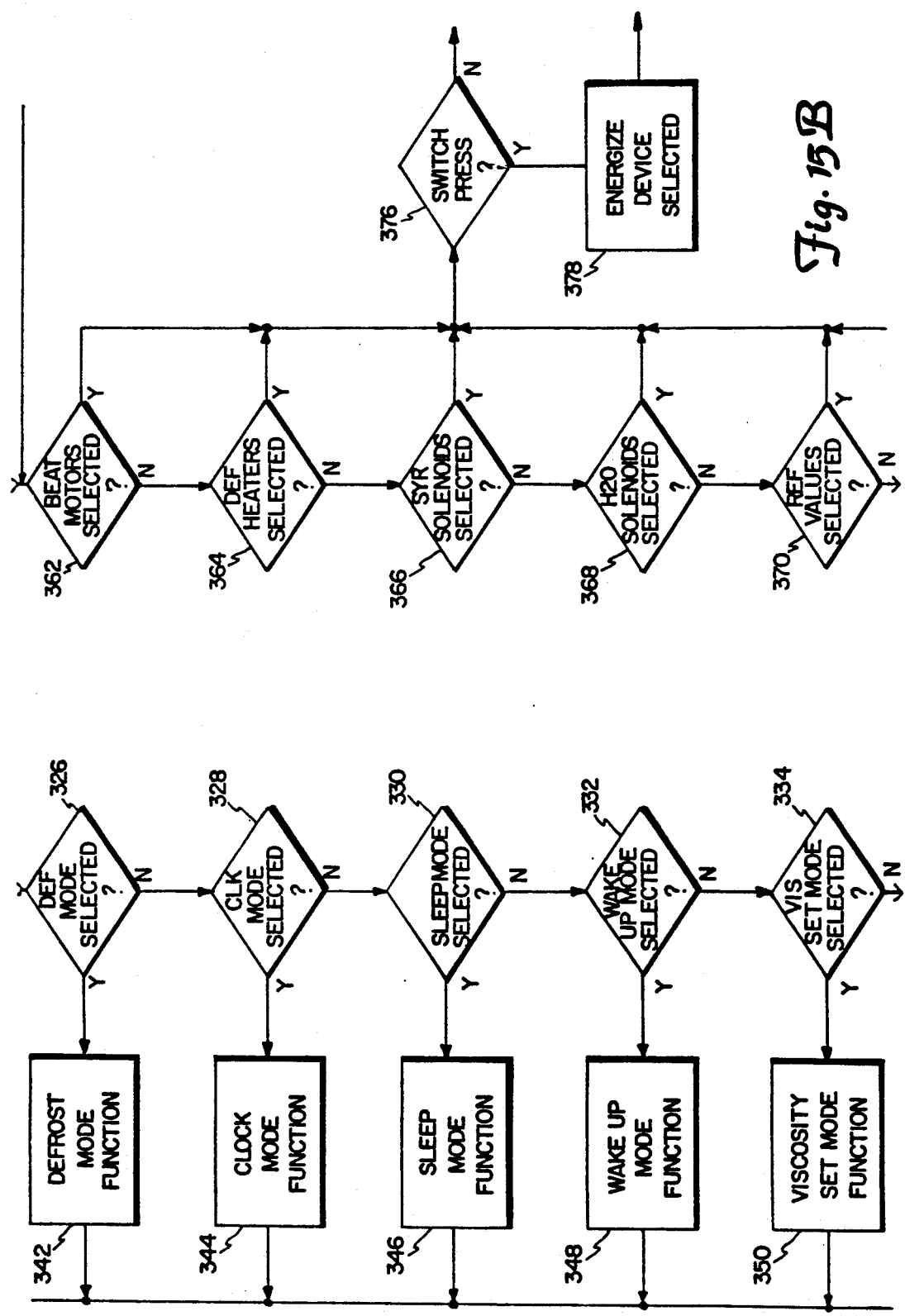
Figure 15C:
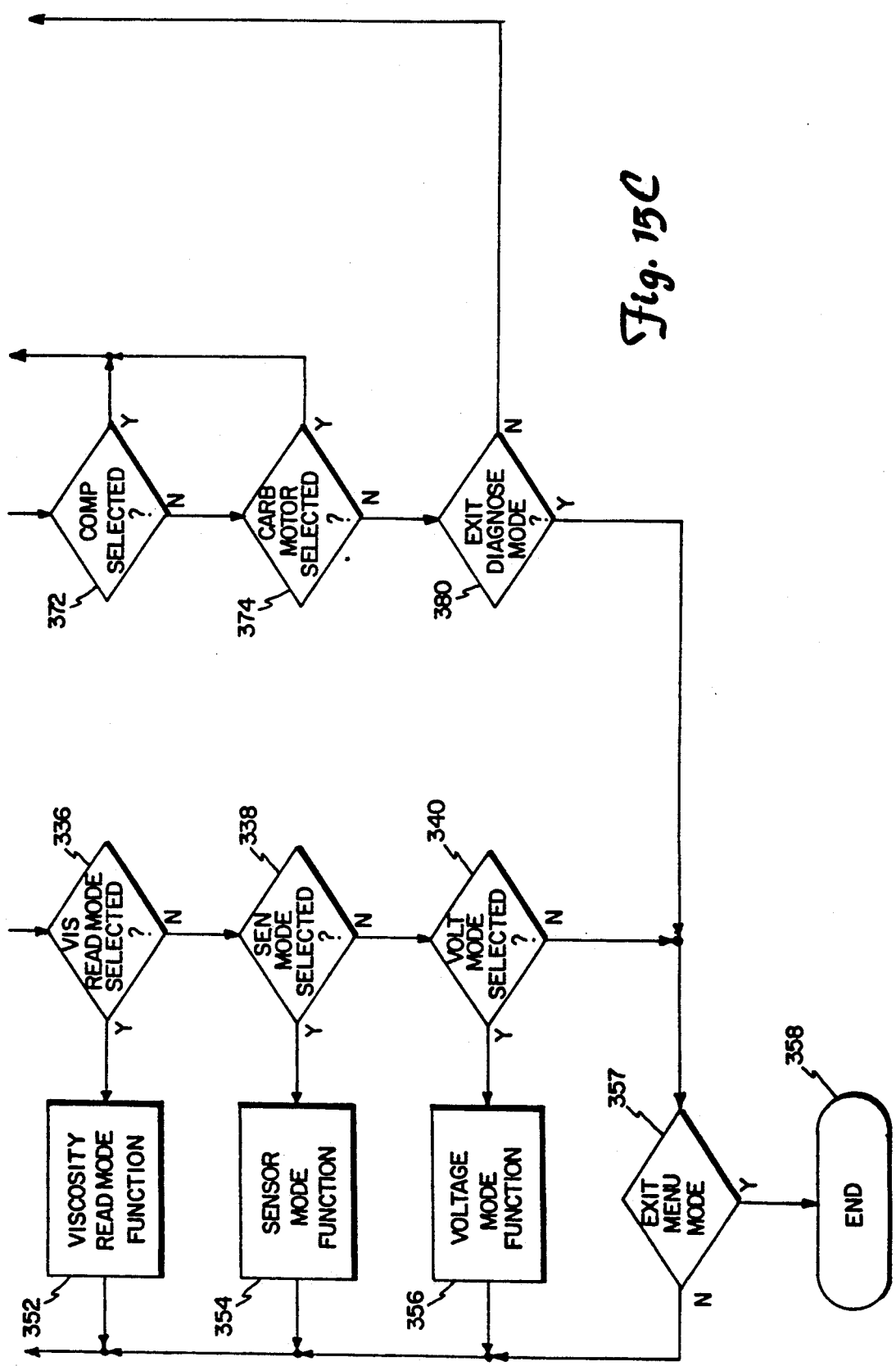

As seen in FIG. 15, selection of the diagnose function (block 324) first signals processor 110 to cut power to all the components of machine 10 (block 359), followed by the incrementing through sub-functions thereof (block 360) by repeated actuating of a switch 12a and selection of the particular function (block 376) by the actuating of a further designated switch 12a. The sub-functions are: motors (block 362), heaters (block 364), syrup (block 366), water (block 368), valves (block 370), compressor (block 372), and pump (block 374). Selection of the motors, heaters, syrup, water or valves functions, allows the individual analysis of the operation of either motor 18a or 18b, heater pair 46a or 46b, syrup solenoids 75a or 75b, carbonated water solenoids 85a or 85b, or expansion valves 32a or 32b. Once a particular component has been selected, checking the operation thereof is accomplished by the temporary energizing of each component separately through the brief pushing of a designated switch 12a (block 378). It will be understood that each function block 362–370 actually represents a sub-selection between the related component for each cylinder 20a and 20b. Block 380 represents the use of a designated switch 12a that allows for backing out of the diagnose or display functions, to the original operating modes (blocks 392). It can now be appreciated that the operation of various critical components of machine 10 can be checked initially very quickly by simply listening for such operation and/or the sounds made by the energizing of associated relays or solenoids. In addition, the diagnose function can allow for more quantitative analysis of critical component function through the use of voltage of ohm meters, and the like.

Figure 16A:
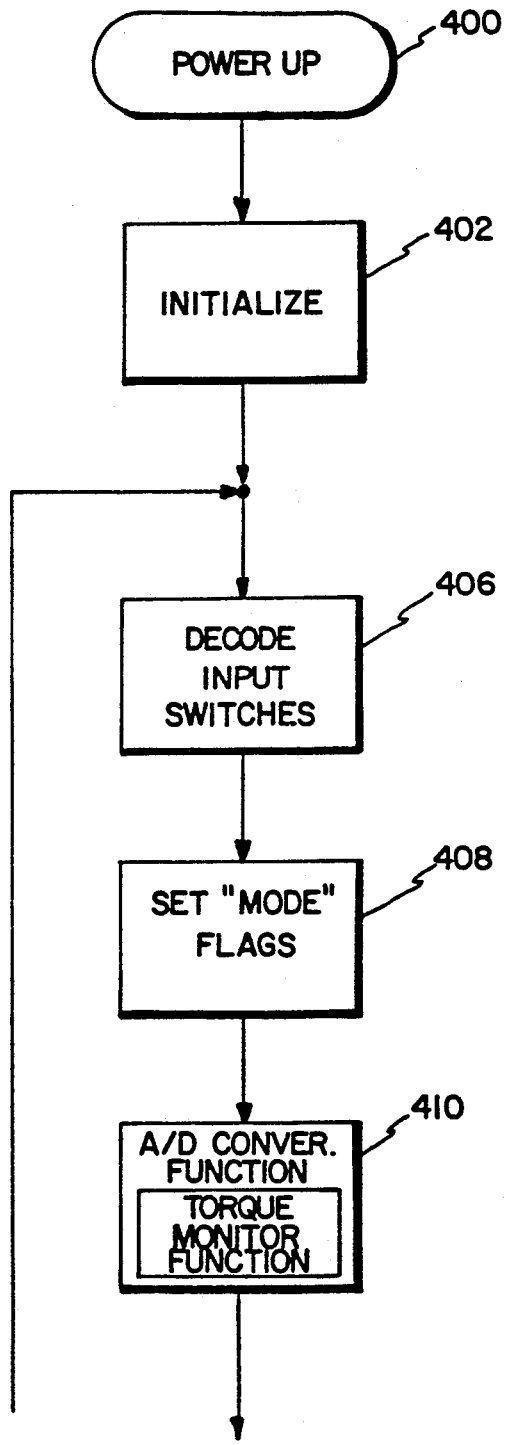
FIGS. 16A-16B show a flow diagram of the overall operation of the control of the present invention.
Figure 16B:
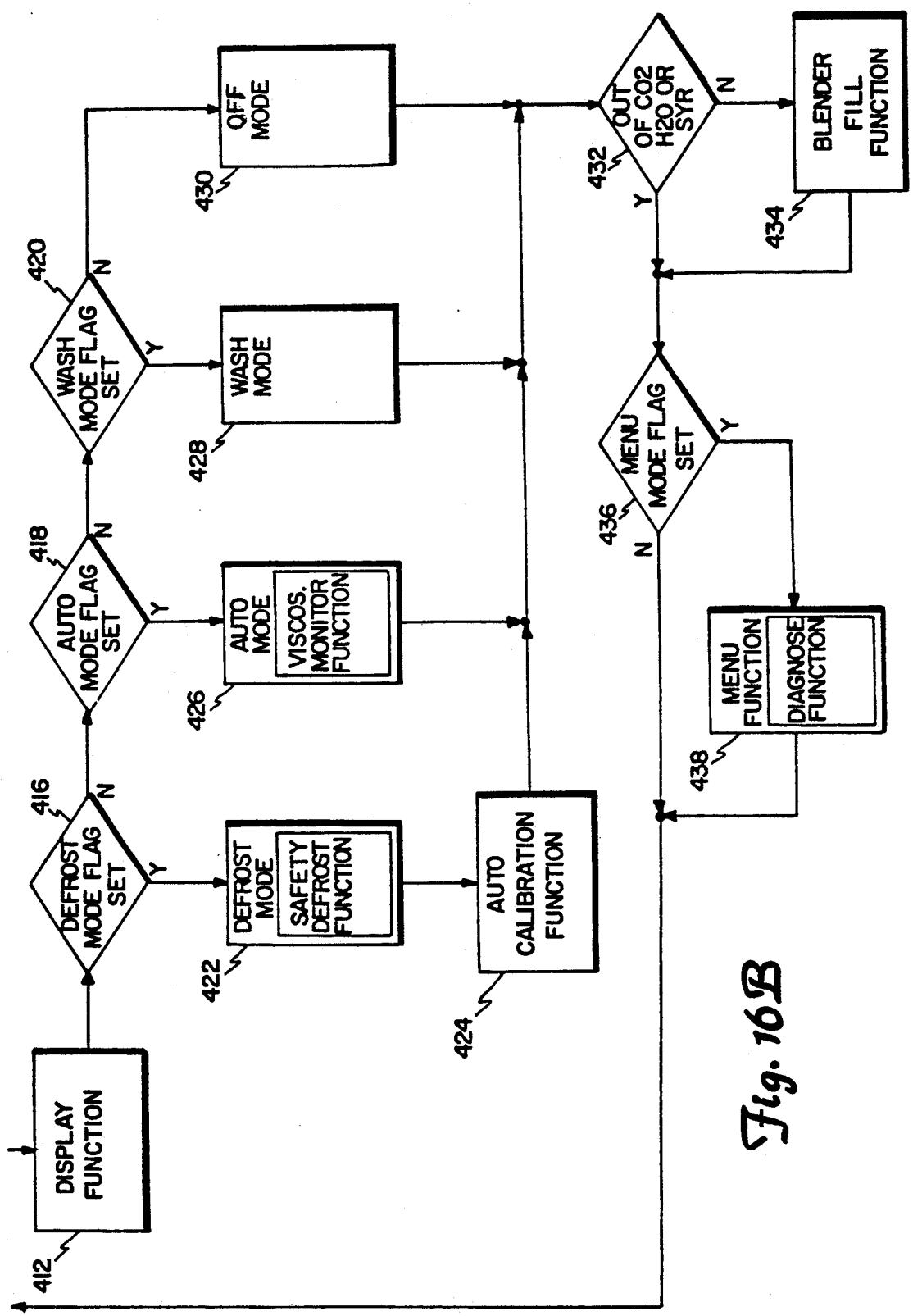

The overall operational control of machine 10 by the program of the present can be had by referring to FIG. 16. As seen therein, machine 10 is first powered-up (block 400), after which the initializing programming is started (block 402). It is understood by those of skill that an initialize program provides for a coordinated starting of machine 10 by control 100, by resetting the external input/output circuitry, clearing all user RAM and the like. After initialization, all input switches 12a are decoded (block 406), after which the mode flags are set (block 408). An analog-to-digital conversion function is then started (block 410). Block 410 includes the torque monitoring sub-routine of FIG. 11. A mode monitoring function is commenced at block 412, and display 12b is utilized to display the particular mode the machine is in, as determined by decision blocks 416, 418 and 420. Thus, if the defrost function is set (block 416), machine 10 goes into the defrost mode (block 422), which includes the defrost sub-routine as is described above in conjuction with FIG. 14. In addition, as previously explained, after each defrost cycle, machine 10 is recalibrated (block 424) as per the auto-calibration sub-routine of FIG. 12. If the auto mode has been selected (block 418), machine 10 is refrigerating and producing frozen beverage (block 426). The automatic mode includes the viscosity monitor sub-routine of FIG. 12. If the wash mode is selected, (block 420), machine 10 goes through the wash mode wherein no refrigeration or heater operation occurs (block 428). If the defrost, automatic, or wash modes are not selected, machine 10 is in the off mode (block 430). Control 100 of machine 10 is always monitoring carbon dioxide pressure with sensor 61, water pressure with sensor 80, and for the presence or lack of syrup with sensors 74a and 74b. If these sensors indicate deficiencies of carbon dioxide pressure, water pressure or lack of syrup (block 432), a message is displayed indicating such a problem. If no such deficiencies are seen, the blender bottle fill function (block 434) will not be disabled. The bottles 65 and 66 will be allowed to fill in response to level sensors 86a and 86b by operation of valves 85a and 86b and 75a and 75b. If, during any mode, a "menu" flag is set (block 436) the display function can be entered (block 438). The display function includes the display/diagnose sub-routine of FIG. 15.

It will be understood serial communication 110b allows for access to all variables stored in the microprocessor (RAM, EEPROM, etc.). Such information can include the viscosity set-points of cylinders 20a and 20b, the cumulative auto-calibration total for each cylinder, the preset automatic defrost times, and the sleep and awake times.

The present invention has been described herein with reference to various preferred embodiments. However, those of skill in the art will recognize that changes may be made in form and detail to the present invention without departing from the spirit and scope thereof.

I claim:

1. A frozen carbonated beverage machine including:
   a freezing container for retaining and producing the beverage therein,
   refrigeration means including a compressor, and an evaporator, the evaporator secured to the exterior of the freezing container for providing freezing of the beverage retained therein and the evaporator having expansion valve means for regulating the flow of refrigerant therethrough, harvesting means in the freezing cylinder for harvesting frozen beverage from the interior surface thereof,
   a drive motor for operating the harvesting means,
   heating means in close association with the freezing cylinder for providing heating of beverage contained therein,
   electronic control means, the control means connected to the heating means and to means for sensing the viscosity of the beverage and the control providing for the monitoring of the sensed viscosity and for operating the heating means for defrosting the beverage therein and the control terminating the heating of the cylinder if the sensed viscosity remains stable for a first predetermined period of time.

2. The machine as defined in claim 1, and the control initiating a second predetermined period of time when initiating the heating of the cylinder and terminating the heating of the cylinder at the end of the second time period if during the second time period the viscosity of the beverage is not stable for the first time period.

3. The machine as defined in claim 2, and the control means having voltage sensing means for sensing the voltage of a power supply for operating the machine and the control means sensing the voltage of the power supply prior to each initiating of defrosting for setting the second time period to a plurality of values depending upon the sensed voltage.

4. The machine as defined in claim 1, and the control first providing for the freezing of the beverage to a predetermined viscosity prior to initiating defrosting.

5. The machine as defined in claim 4, and the control providing for a third predetermined time period commencing at the initiating of freezing, and the control terminating freezing of the beverage if the sensed viscosity does not reach the predetermined viscosity level during the third time period.

6. The machine as defined in claim 1, and the heating means in series with a first switch and the first switch operated by the control means for closing the first switch when heating is desired for initiating defrosting, and the control means having current sensing means for sensing current flow through the heating means and the control means sensing such current flow prior to initiating to each defrosting and preventing closing of the first switch if current is detected prior to closing of the first switch.

7. The machine as defined in claim 6, and the heating means in series with the first switch means and a second switch means and the second switch means operated by the control means for closing the first switch and the second switch means when heating is desired for initiating defrosting and each time defrosting is to be initiated the control means checking for current flow with the first switch means open and the second switch means closed and subsequently with the first switch means closed and the second switch means open and terminating defrosting if current flow is detected with either the first and second switch means are open.

8. The machine as defined in claim 7, and the control means checking for current flow when both the first and second switch means are closed for initiating defrosting and terminating defrosting if no current flow is detected.

9. A frozen carbonated beverage machine including:
a freezing container for retaining and producing the beverage therein,
refrigeration means including a compressor, and an evaporator, the evaporator secured to the exterior of the freezing container for providing freezing of the beverage retained therein and the evaporator having expansion valve means for regulating the flow or refrigerant therethrough, harvesting means in the freezing cylinder for harvesting frozen beverage from the interior surface thereof,
a drive motor for operating the harvesting means,
heating means in close association with the freezing cylinder for providing heating of beverage contained therein,
electronic control means, the control means connected to the heating means and to means for sensing the viscosity of the beverage and the control providing for the monitoring of the sensed viscosity and the control first providing for the freezing of the beverage to a predetermined viscosity prior to initiating defrosting and operating the heating means for defrosting the beverage therein when the predetermined viscosity is reached and the control terminating the heating of the cylinder if the sensed viscosity remains stable for a first predetermined period of time.

10. The machine as defined in claim 9, and the control commencing a second predetermined period of time when initiating the heating of the cylinder and terminating the heating of the cylinder at the end of the second time period if during the second time period the viscosity of the beverage is not stable for the first time period.

11. The machine as defined in claim 10, and the control means having voltage sensing means for sensing the voltage of a power supply for operating the machine and the control means sensing the voltage of the power supply prior to each initiating of defrosting for setting the second time period to a plurality of values depending upon the sensed voltage.

12. The machine as defined in claim 9, and the control providing for a third predetermined time period commencing at the initiating of freezing, and the control terminating freezing of the beverage if the sensed viscosity does not reach the predetermined viscosity level during the third time period.

13. The machine as defined in claim 9, and the heating means in series with a first switch and the first switch operated by the control means for closing the first switch when heating is desired for initiating defrosting, and the control means having current sensing means for sensing current flow through the heating means and the control means sensing such current flow prior to initiating of each defrosting and preventing closing of the first switch if current is detected prior to closing of the first switch.

14. The machine as defined in claim 13, and the heating means in series with the first switch means and a second switch means and the second switch means operated by the control means for closing the first switch and the second switch means when heating is desired for initiating defrosting and each time defrosting is to be initiated the control means checking for current flow with the first switch means open and the second switch means closed and subsequently with the first switch means closed and the second switch means open and terminating defrosting if current flow is detected with either the first or second switch means are open.

15. The machine as defined in claim 14, and the control means checking for current flow when both the first and second switch means are closed for initiating defrosting and terminating defrosting if no current flow is detected.

16. A frozen carbonated beverage machine including:
a freezing container for retaining and producing the beverage therein,
refrigeration means including a compressor, and an evaporator, the evaporator secured to the exterior of the freezing container for providing freezing of the beverage retained therein and the evaporator having expansion valve means for regulating the flow of refrigerant therethrough, harvesting means in the freezing cylinder for harvesting frozen beverage from the interior surface thereof,
a drive motor for operating the harvesting means,
heating means in close association with the freezing cylinder for providing heating of beverage contained therein,
electronic control means, the control means connected to the heating means and to means for sensing the viscosity of the beverage and the control providing for the monitoring of the sensed viscosity and the control first providing for the freezing of the beverage to a predetermined viscosity prior to initiating defrosting and operating the heating means for defrosting the beverage therein when the predetermined viscosity is reached and the control terminating the heating of the cylinder if the sensed viscosity remains stable for a first predetermined period of time, and the heating means in series with a first switch and the first switch operated by the control means for closing the first switch when heating is desired for initiating defrosting, and the control means having current sensing means for sensing current flow through the heating means and the control means sensing such current flow prior to initiating of each defrosting and preventing closing of the first switch if current is detected prior to closing of the first switch.

17. The machine as defined in claim 16, and the control commencing a second predetermined period of time when initiating the heating of the cylinder and terminating the heating of the cylinder at the end of the second time period if during the second time period the viscosity of the beverage is not stable for the first time period.

18. The machine as defined in claim 17, and the control means having voltage sensing means for sensing the voltage of a power supply for operating the machine and the control means sensing the voltage of the power supply prior to each initiating of defrosting for setting the second time period to a plurality of values depending upon the sensed voltage.

19. The machine as defined in claim 16, and the control providing for a third predetermined time period commencing at the initiating of freezing, and the control terminating freezing of the beverage if the sensed viscosity does not reach the predetermined viscosity level during the third time period.

20. The machine as defined in claim 16, and the heating means in series with the first switch means and a second switch means and the second switch means operated by the control means for closing the first switch and the second switch means when heating is desired for initiating defrosting and each time defrosting is to be initiated the control means checking for current flow with the first switch means open and the second switch means closed and subsequently with the first switch means closed and the second switch means open and terminating defrosting if current flow is detected with either the first or second switch means are open.

21. The machine as defined in claim 20, and the control means checking for current flow when both the first and second switch means are closed for initiating defrosting and terminating defrosting if no current flow is detected.

22. A method for controlling a carbonated beverage machine, the beverage machine having a freezing container for retaining and producing the beverage therein, refrigeration means including a compressor, and an evaporator, the evaporator secured to the exterior of the freezing container for providing freezing of the beverage retained therein and the evaporator having expansion valve means for regulating the flow of refrigerant therethrough, harvesting means in the freezing cylinder for harvesting frozen beverage from the interior surface thereof, a drive motor for operating the harvesting means, heating means in close association with the freezing cylinder for providing heating of beverage contained therein, the method comprising the steps of:

initiating operating of the heating means for defrosting the beverage, monitoring the viscosity of the beverage in the cylinder, terminating the operating of the heating means if the viscosity of the beverage remains stable for a first predetermined period of time.

23. The method as defined in claim 22, and further including the steps of initiating a second predetermined period of time when initiating the heating of the cylinder and terminating the heating of the cylinder at the end of the second time period if during the second time period the viscosity of the beverage is not stable for the first time period.

24. The method as defined in claim 22, and further including the step of initiating freezing of the beverage to a predetermined viscosity prior to initiating defrosting.

25. The method as defined in claim 24, and providing for a third predetermined time period commencing at the initiating of freezing, and terminating freezing of the beverage if the sensed viscosity doe not reach the predetermined viscosity level during the third time period.

26. The method as defined in claim 22, and the heating means in series with a first switch and the first switch closing the first switch when heating is desired for initiating defrosting, and sensing current flow through the heating means prior to initiating of each defrosting and preventing closing of the first switch if current is detected prior to closing of the first switch.

27. The method as defined in claim 26, and the heating means in series with the first switch means and a second switch means and the second switch means and closing the first and second switch means when heating is desired for initiating defrosting and each time defrosting is to be initiated checking for current flow with the first switch means open and the second switch means closed and subsequently with the first switch means closed and the second switch means open and terminating defrosting if current flow is detected when either the first or second switch means are open.

28. The method as defined in claim 27, and checking for current flow when both the first and second switch means are closed for initiating defrosting and terminating defrosting if no current flow is detected.

29. The method as defined in claim 22, and sensing the voltage of a power supply for operating the machine and sensing the voltage of the power supply prior to each initiating of defrosting for setting the second time period to a plurality of values depending upon the sensed voltage.

* * * * *